(12) United States Patent
Rohlfs

(10) Patent No.: US 10,269,070 B2
(45) Date of Patent: Apr. 23, 2019

(54) SYSTEM AND METHOD FOR SHARIA-BASED ENERGY MARKET HEDGING AND RELATED

(71) Applicant: DEARBORN FINANCIAL, INC., St. Charles, IL (US)

(72) Inventor: Michael B. Rohlfs, Northbrook, IL (US)

(73) Assignee: Dearborn Financial, Inc., St. Charles, IL (US)

( * ) Notice: Subject to any disclaimer, the term of this patent is extended or adjusted under 35 U.S.C. 154(b) by 457 days.

(21) Appl. No.: 14/657,427

(22) Filed: Mar. 13, 2015

(65) Prior Publication Data
US 2015/0221032 A1   Aug. 6, 2015

Related U.S. Application Data

(63) Continuation-in-part of application No. PCT/US2014/032976, filed on Apr. 4, 2014.
(Continued)

(51) Int. Cl.
*G06Q 40/04* (2012.01)
(52) U.S. Cl.
CPC .................... *G06Q 40/04* (2013.01)
(58) Field of Classification Search
USPC ......................................................... 705/37
See application file for complete search history.

(56) References Cited

U.S. PATENT DOCUMENTS 7,797,225 B1 *  9/2010  Kemp ................... G06Q 40/00
                                                                   705/35
8,046,286 B2 * 10/2011  Chorna ................ G06Q 40/00
                                                                   705/36 R
(Continued)

OTHER PUBLICATIONS

International Search Report regarding Application No. PCT/US2014/032976, ISA/KR, dated Aug. 27, 2014.
(Continued)

*Primary Examiner* — Robert R Niquette
(74) *Attorney, Agent, or Firm* — Stephen T. Olson; Harness, Dickey & Pierce, P.L.C.

(57) ABSTRACT

A tradable asset market trading and hedging system is disclosed. The tradable assets may include fuels or industrial minerals and rocks (IMRs). The system may include a conventional Exchange and its Islamic exchange affiliate or subsidiary ("IES"), a Sharia conversion module (both hardware and software), and a back-to-back order execution module (also both hardware and software). The IES makes use of a suitable cross-liquidity algorithm for the purpose of consolidating bids and offers from the Exchange and the IES in order to enhance IES liquidity. An entity that qualifies for Sharia-based trading with the IES may be issued a customized dongle to inter alia regulate and control who can access what data at any given time. The dongle interfaces with a computing device (e.g., laptop, desktop, tablet, etc.) used by an individual, institution or other qualified entity to access the IES. The dongle may include a customer position limits enforcement module and a high frequency trading order stuffing block module that are both in communication with a suitable processor. The system and method enables Sharia-compliant trades to be executed, including those trades that are attendant to Islamic-financed transactions.

28 Claims, 11 Drawing Sheets

Related U.S. Application Data

(60) Provisional application No. 61/810,063, filed on Apr. 9, 2013.

(56) References Cited

U.S. PATENT DOCUMENTS

| | | | |
|---|---|---|---|
| 2002/0198817 A1 | 12/2002 | Dhir | |
| 2007/0038551 A1* | 2/2007 | Shah | G06Q 40/04 |
| | | | 705/37 |
| 2008/0027847 A1* | 1/2008 | Masucci | G06Q 40/00 |
| | | | 705/36 R |
| 2008/0033833 A1 | 2/2008 | Senior | |
| 2011/0153492 A1* | 6/2011 | Gainor | G06Q 20/10 |
| | | | 705/39 |
| 2013/0036039 A1* | 2/2013 | Rohlfs | G06Q 40/04 |
| | | | 705/37 |
| 2013/0036071 A1 | 2/2013 | Rouwenhorst et al. | |

OTHER PUBLICATIONS

Written Opinion of ISA regarding Application No. PCT/US2014/032976, ISA/KR, dated Aug. 27, 2014.

* cited by examiner

| Description: Field/Country | Barrels Per Day (BPD) | API Gravity | Sulfur % Content | Weighted Average API Gravity | Weighted Average Sulfur Content |
|---|---|---|---|---|---|
| MEWA Extra Light Crude Oil | | | | | |
| Qatar Dukhan | 300,000 | 41.1 | 1.22% | 4.00 | 0.12% |
| Abu Dhabi Zakum | 300,000 | 40.9 | 1.03% | 3.98 | 0.10% |
| Abu Dhabi (UAE) Murban | 1,200,000 | 39.6 | 0.79% | 15.43 | 0.31% |
| Arab Extra Light | 1,100,000 | 39.3 | 1.07% | 14.11 | 0.38% |
| Abu Dhabi Umm Shaif | 180,000 | 36.5 | 1.39% | 2.13 | 0.08% |
| Total MEWA Extra Light Crude Oil | 3,080,000 | | | 39.66 | 0.99% |
| MEWA Light Crude Oil | | | | | |
| Iran Lavan Blend | 92,000 | 35.2 | 1.78% | 0.39 | 0.02% |
| Abu Dhabi Upper Zakum | 455,000 | 34.9 | 1.89% | 1.89 | 0.10% |
| Iran Light | 1,600,000 | 32.4 | 1.36% | 6.09 | 0.25% |
| Iran Siri | 120,000 | 33.3 | 1.79% | 0.49 | 0.05% |
| *Arab Light | 4,900,000 | 33.0 | 1.83% | 19.66 | 1.09% |
| Oman | 812,000 | 33.0 | 1.14% | 3.26 | 0.11% |
| Iran Doroud | 120,000 | 32.8 | 2.96% | 0.48 | 0.04% |
| *Qatar Marine | 230,000 | 32.7 | 1.89% | 0.91 | 0.05% |
| Total MEWA Light Crude Oil | 8,329,000 | | | 33.15 | 1.69% |
| MEWA Medium Crude Oil | | | | | |
| Arab Medium | 850,000 | 30.5 | 2.56% | 3.41 | 0.29% |
| *Kuwait Export | 2,000,000 | 30.5 | 2.60% | 8.03 | 0.68% |
| Dubai Fateh Dubai UAE | 54,000 | 30.4 | 2.13% | 0.22 | 0.02% |
| Iraq Basrah | 1,600,000 | 30.2 | 2.52% | 6.39 | 0.53% |
| Iran Foroozan | 300,000 | 30.1 | 2.31% | 1.19 | 0.09% |
| Iran Heavy | 1,400,000 | 29.5 | 1.99% | 5.44 | 0.37% |
| Khafji, Neutral Zone | 240,000 | 28.5 | 2.85% | 0.90 | 0.09% |
| Qatar Al-Shaheen | 300,000 | 28.0 | 2.37% | 1.11 | 0.09% |
| Arab Heavy | 850,000 | 27.6 | 2.94% | 3.09 | 0.33% |
| Total MEWA Medium Crude Oil | 7,594,000 | | | 29.75 | 2.49% |

FIGURE 2

Fig. 1 Table Illustrating Sharia Conversion Logic

| Conventional Exchange Trading Mode | IES (Sharia-Based) Trading Mode | IES Execution with Back-to-Back Execution Trigger? Code | Note Ref. |
|---|---|---|---|
| Crude Oil Spot | Crude Oil Spot for Mussawama<br>Crude Oil Spot for Murabaha | Yes or No<br>Yes | 1, 2<br>2 |
| Crude Oil EFP Futures | Crude Oil EFP Futures for Mussawama<br>Crude Oil EFP Futures for Murabaha | Yes or No<br>Yes | 1, 2<br>2 |
| Call Options on Crude Oil EFP Futures | Wa'ad Call on Crude Oil EFP Futures for Mussawama<br>Wa'ad Call on Crude Oil EFP Futures for Murabaha | Yes or No<br>No | 1, 2<br>2 |
| Put Options on Crude Oil EFP Futures | Wa'ad Put on Crude Oil EFP Futures for Mussawama<br>Wa'ad Put on Crude Oil EFP Futures for Murabaha | Yes or No<br>No | 1, 2<br>2 |
| API Gravity Differential Index (Spot) | API Gravity Differential Index (Spot) for Mussawama<br>API Gravity Differential Index (Spot) for Murabaha | Yes or No<br>Yes | 1, 2<br>2 |
| API Gravity Differential for Crude Oil EFP Futures | API Gravity Differential for Crude Oil EFP Futures, for Mussawama<br>API Gravity Differential for Crude Oil EFP Futures, for Murabaha | Yes or No<br>Yes | 1, 2<br>2 |
| Sulfur Content Differential Index for Crude Oil (Spot) | Sulfur Content Differential Index for Crude Oil (Spot), for Mussawama<br>Sulfur Content Differential Index for Crude Oil (Spot), for Murabaha | Yes or No<br>Yes | 1, 2<br>2 |
| Sulfur Content Differential for Crude Oil EFP Futures | Sulfur Content Differential for Crude Oil, for Mussawama<br>Sulfur Content Differential for Crude Oil, for Murabaha | Yes or No<br>Yes | 1, 2<br>2 |

FIGURE 10A

| Cost Basis Disclosed? | | IB Financing? | | Contract Settlement or Maintenance Terms | |
|---|---|---|---|---|---|
| Code | Note Ref. | Code | Note Ref. | Code | Note Ref. |
| No | 1 | Yes or No | 1, 2 | Cash for Delivery or Delivery for Cash | 1 |
| Yes | 2 | Yes | 2 | Cash for Delivery or Delivery for Cash | 2 |
| No | 1 | Yes or No | 1, 2 | Cash Margin or Escrow Deposit | 1, 4 |
| Yes | 2 | Yes | 2 | Escrow Deposit | 4 |
| No | 1, 3 | Yes or No | 1, 3 | Cash Margin or Reciprocal Zero Cost | 1, 3 |
| Yes | 3 | Yes | 3 | Reciprocal Zero Cost | 3 |
| No | 1, 3 | Yes or No | 1, 3 | Cash Margin or Reciprocal Zero Cost | 1, 3 |
| Yes | 3 | Yes | 3 | Reciprocal Zero Cost | 3 |
| No | 1 | Yes or No | 1, 2 | Cash for Delivery or Delivery for Cash | 1 |
| Yes | 2 | Yes | 2 | Cash for Delivery or Delivery for Cash | 2 |
| No | 1 | Yes or No | 1, 2 | Cash Margin or Escrow Deposit | 1, 4 |
| Yes | 2 | Yes | 2 | Escrow Deposit | 4 |
| No | 1 | Yes or No | 1, 2 | Cash for Delivery or Delivery for Cash | 1 |
| Yes | 2 | Yes | 2 | Cash for Delivery or Delivery for Cash | 2 |
| No | 1 | Yes or No | 1, 2 | Cash Margin or Escrow Deposit | 1, 4 |
| Yes | 2 | Yes | 2 | Escrow Deposit | 4 |

FIGURE 10B

SYSTEM AND METHOD FOR SHARIA-BASED ENERGY MARKET HEDGING AND RELATED

CROSS-REFERENCE TO RELATED APPLICATIONS

This application is a continuation-in-part of PCT International Application, international application number PCT/US2014/032976, filed Apr. 4, 2014, which claims the benefit of U.S. Provisional Application No. 61/810,063 filed on Apr. 9, 2013. The entire disclosure of each of the above identified applications is hereby incorporated herein by reference into the present disclosure.

FIELD

The present teachings generally pertain to systems and methods for commodities trading, and more particularly to systems and methods for creating a Sharia compliant energy trading platform for executing Sharia compliant trades and Sharia compliant market hedging.

INTRODUCTION

Background

The statements in this section merely provide background information related to the present disclosure and may not constitute prior art.

Global Energy e-Bourse (the "Exchange") is an electronic trading platform which facilitates the hedging of financial risks caused by energy market price movements, inter alia those associated with crude oil and refined products exported by state-owned oil companies in the Middle East ("ME") to customers in the growing East of Suez ("ES") market corridor.

Many buyers and sellers of ME/ES crude oil and refined products reside and/or conduct business in countries where the Muslim community comprises a substantial or dominant part of the population. At present there are over 1.7 billion Muslims amounting to 23% of the global populace (and a much larger share in the ME/ES market corridor), many of whom strive to abide by principles conforming to religious values and beliefs based on Sharia (Islamic Law). To Muslims, the notion of employing commodity trading and derivatives solutions for legitimate hedging purposes based on Sharia (Islamic Law) has gained acceptance within a rapidly evolving field of global commerce. The present disclosure aims to advance the art in that field by establishing an outlet for Sharia-based versions of the energy market hedging system, method and instruments taught in U.S. patent application Ser. No. 13/558,974, and as will be more fully described herein.

The present application provides background information on relevant aspects of Sharia and cites cases of Sharia-based commodity trading platforms and derivatives solutions currently in the field. The present disclosure further assesses the future direction of Sharia-based financial innovation that could benefit the field and, lastly, describes the proprietary system and method by which transactions involving the Exchange's instruments, as detailed herein, are uniquely designed to meet substantive Sharia compliance tests while aiming to benefit both the global energy market and the Islamic finance and investment market.

It will be understood that Sharia, the moral code and religious law of Islam, deals with topics addressed by secular law (e.g., crime, politics, economics), as well as personal matters (e.g., prayer, diet, fasting, hygiene, sex). As part of the process Sharia identifies and promotes economic order conforming to Islamic scripture and traditions. In the last decade or so major initiatives have been undertaken to ensure that Sharia-based economic order remains intact within a rapidly changing financial world. That requires ongoing financial innovation to coincide with core Islamic principles aimed at reducing the gap between rich and poor by encouraging trade, discouraging the hoarding of wealth and prohibiting the practice of usury (riba).

There are two Primary Sources of Sharia law. The first involves the precepts set forth in the Koran (Quran), Islam's religious text, which Muslims consider the verbatim word of God (Allah) as revealed to the Prophet Muhammad by the angel Gabriel. The second involves examples set by Muhammad in the Sunnah, recordings of the Prophet's specific words, habits, practices and silent approvals, all of which prescribe life lessons to deal with such matters as those involving family, friends, communities, businesses and governments.

In jurisdictions where it has official stature, Sharia is interpreted by Islamic judges (qadis) with varying responsibilities for the religious leaders (imams). In cases not directly addressed by Primary Sources, Sharia is subjected to human interpretation of its laws (fiqh) through the conduct of religious scholars (ulama) thought to embody the consensus of the Muslim Community (ijma).

Following is a summary of principles and factors that are relevant to the Exchange's electronic trading platform designed for Sharia-based hedging of energy market price movements, including but not limited to those associated with ME/ES crude oil and refined products, starting with what is generally prohibited:

Gharar (uncertainty in contracts) may apply to the sale of an item whose existence or characteristics are not certain, and upon contractual terms that are ambiguous or unclear; this may include contracts, which contain obligations to insure another person or grant an option to purchase an asset.

Maisir (gambling) may apply to certain dealings in conventional futures and options markets to the extent that they are deemed to be speculative in nature.

Haram (prohibited commodity or activity) pertains primarily to pork, alcohol and gambling services.

Common practices generally deemed permissible are noted next:

Murabaha (form of Islamic financing) involves Party A (typically an Islamic Bank) buying a desired physical commodity (e.g., crude oil) at a certain cost and then selling it to Party B (typically a bank customer) at a cost-plus-profit basis. Party B will then pay back the amount, plus the agreed-upon profit, to Party A on a deferred payment basis.

Tawarruq (financing solution providing desired liquidity) involves two stages (i) Murabaha Stage whereby Party A (Islamic Bank) and Party B (bank customer) enter into a commodity contract, which results in Party B owning the underlying commodity either physically or constructively; and (ii) Asset Liquidation Stage where Party B can sell/liquidate the commodity either directly in the spot market or through an agency agreement employing Party A.

Musawama (Islamic trade) involves both Seller and Buyer negotiating the selling price of a commodity without Buyer knowing the actual cost of the commodity. In order for the trade to be Sharia compliant, three conditions must be met: (i) the underlying commodity must be owned by Seller prior to the trade, (ii) the sale must take place at the time of the commodity trade, rather than some date in the future and (iii) the commodity must be valuable and usable.

Wa'ad (promise) is somewhat similar to a social promise in Common Law. In those cases, wa'ad may have moral consequences in that its breaking could provoke social blame but perhaps not entail legal obligations or sanctions. However, the Islamic Fiqh Academy has decided that wa'ad is obligatory not only in the eyes of God but also in a court of law when (i) made as part of a commercial transaction; (ii) it is a unilateral promise; and (iii) causes the Promissee to incur liabilities. Another ruling indicates that if wa'ad is made as part of an asset sale completed at majlis al-aqud (point when there is both an exchange of an offer and its acceptance), then the timing of the wa'ad takes a back seat. In such cases, the Promisee is able to claim actual damages against the Promissor if the latter backs out of a wa'ad.

Tahawwut (hedging) involves each party issuing an undertaking to enter into a contract in the future for the sale of assets following the designation of an early termination date. Under Sharia principles, the tahawwut must be strictly linked to underlying transactions and cannot, itself, be a transaction conducted for the sole purpose of making money from money.

Salam is a contract whereby its partners deal with each other in a transaction involving a future obligation (e.g., the deferred physical delivery of a halal commodity), which must be reduced to writing (per Surah Al Baqari Verse 282) and done so on the basis of specified weight and scale. In the context of one embodiment of this invention, Salam-style energy transactions match the bilateral interests of Exchange-For-Physical ("EFP") buyers and sellers having practically, rather than absolute, opposite hedging interests, thereby generating a structure that meets the bona fide commercial objectives of fuel producers, refiners, importers and exporters, plus Islamic banks and investors. To that end, the protection seller may be required to own the referenced asset at the inception of each transaction, the price of which should be negotiated and executed by the counterparties on the spot (i.e., trade date).

Recent Landmark Events

In recent years, there have been two landmark events in the field (noted directly below): one involving a Sharia-based commodity trading platform and another that provides standardized over-the-counter ("OTC") derivatives agreements sanctioned for trade.

Bursa Malaysia through its wholly-owned subsidiary, Bursa Malaysia Islamic Services Sdn. Bhd., launched Bursa Suq Al-Sila ("BSAS") in August 2009. Originally known as the Commodity Murabahah House, BSAS became the world's first Shariah-based commodity trading platform through collaborative efforts of Bursa Malaysia, Bank Negara Malaysia (Central Bank), the Securities Commission of Malaysia and a host of industry players in support of the Malaysia International Islamic Financial Centre Initiative. BSAS's initial underlying commodity, crude palm oil, was later joined by plastic resin and Rbd palm olein. As inferred by its original name, BSAS embraces the commodity Murabaha concept.

The ISDA/IIFM Tahawwut Master Agreement ("TMA") and its accompanying Explanatory Memorandum were completed in March 2010 through collaborative efforts of the International Swaps and Derivatives Association and the International Islamic Financial Market. Holding the distinction of being the first globally standardized document approved for privately negotiated Islamic hedging transactions, as well as the first sanctioned in all jurisdictions where Islamic finance is practiced, the TMA inter alia deals with the complexities and costs associated with OTC derivatives agreements. A prior lack of such documentation was viewed as a substantial impediment to prospects for the Islamic finance and investment market's further development.

The TMA expressly contemplates parties entering into underlying Sharia-based transactions, e.g., Murabaha. Given that those transactions typically call for financing parties to take title to the asset in question, financing parties are exposed to commercial risk until their counterparties can ultimately sell/liquidate the asset. To hedge that commercial risk under Sharia, one party undertakes to enter into a transaction in the future at the election of the other party, with said undertaking comprising a wa'ad. The TMA contemplates two distinct sets of wa'ad, noted below:

(i) to enter into designated future transactions ("DFT") between the parties, usually contained in a DFT Confirmation that is part and parcel to a DFT Terms Agreement; and (ii) to enter into Musawama in the event of an early termination date.

Although the TMA is described as Sharia compliant, it requires standard representations by each party containing the following caveats: "Insofar as [a party] wishes or is required for any reason to enter into transactions which are Sharia compliant it has made its own investigation into and satisfied itself as to the Sharia compliance of this Agreement (including the declaration, pronouncement, opinion or other attestation of the Sharia adviser, board or panel relevant to it where required)". Thus, the TMA is not intended to supplant the need for an opinion from a Sharia ruling body, where required.

In some respects, the TMA's emergence has helped demystify Islamic finance and investment markets by providing generally accepted market documents as the basis for new standards. However, the TMA requires close monitoring since ever-evolving market issues will inevitably arise so as to effect its future application and thus merit careful evaluation. In any event, the TMA will undoubtedly serve well as a benchmark for further standardized documentation as its adherents endeavor to insure that Islamic finance and investment markets keep pace with innovations in the field of global commerce.

Future Direction of Sharia-Based Financial Innovation

Advancing the impact of the landmark events noted above with ongoing Sharia-based financial innovation is pretty much assured for reasons that are well documented in a March 2012 International Monetary Fund working paper authored by Andreas Jobst and Juan Sole', entitled *Operative Principles of Islamic Derivatives—Toward a Coherent Theory.*

As posited in the IMF working paper's conclusion, in light of the $1 trillion (and growing) base of assets lodged in Islamic financial instruments and capital markets, the relatively swift post-crisis [Great Recession] recovery of demand for Sharia compliant structured transactions points to real demand for religiously accepted risk management solutions. The scarcity of Sharia-based instruments to hedge risks arguably comes at an inauspicious time for many Islamic financial institutions as they move to expand activities beyond their original jurisdictions. International diversification of Islamic banking activities will certainly require new and more flexible instruments to better manage price risks that are attendant to underlying assets.

As Islamic finance comes onto its own, and more companies turn to market-based sources of finance, Sharia-based derivatives contracts are expected to become increasingly useful tools to enhance liquidity management, supplement cash markets at lower funding costs, and ensure an efficient transmission of funds from savers to investors. But despite the landmark events of recent years, derivatives in Islamic finance are still very much contested. That is attributed to the fact that some fundamental features of contemporary (or conventional) derivatives—e.g., uncertainty of pay-off, absence of risk sharing, and the potential of speculative use (or abuse)—are not accepted in the tradition of Islamic finance.

Arguably, the restrictive treatment of derivatives under Sharia law seems to deprive Islamic financial institutions of the many advantages derivable from risk transfer mechanisms. Despite the recent advances noted, transparency and risk management practices are still far from being fully developed. The opinion of Sharia scholars is an added consideration that policy makers and regulators in Islamic countries must take into account. Thus, to better leverage the impact of recent landmark events, which certainly represented first steps in the right direction, other risk management techniques are required to advance the art and more broadly reflect core Sharia principles, which in the case of this application supports the rationale behind Sharia-based hedging of energy market price movements, as described herein.

As further posited by Andreas Jobst in March 2008's Hedge Fund Monthly, entitled *Derivatives in Islamic Finance*, implicit forward elements in Islamic finance, much like the forwards in conventional finance, involve double coincidence and counterparty risk that are inherent to privately negotiated customization. Parties to such forward agreements need to have exactly opposite hedging interests, which coincide with the timing of protection sought against adverse price movements, as well as the quality and quantity of asset delivery.

OTC forward contracts elevate the risk of counterparty default when an underlying asset's spot price falls below its forward price prior to maturity, rendering the contract "out-of-the-money" and making deliberate default more attractive. In the realm of Islamic finance, such events may trigger a variety of legal remedies (including litigation), the enforcement of which may be lengthy, cumbersome and expensive, especially in areas of conflicting legal governance (commercial law versus Islamic law).

The obvious shortcomings of privately negotiated OTC forwards create the economic rationale for exchange-traded futures contracts, which inter alia require margin calls and standardized terms of size, quality and maturity, all of which are designed to alleviate the constraints of double coincidence common in forward contracts. However, certain generic aspects unique to conventional futures contracts appear to contravene Shariah principles in the way they limit counterparty risk.

Conventional futures are generally priced daily on a mark to market ("MTM") basis, which requires margin calls from the party that is out-of-the-money. Since the absence of underlying asset transfer renders MTM pricing unacceptable under Sharia law, one possible solution to this problem (per Jobst) could involve marginal adjustments being made to scheduled Murabaha repayments in the event of material declines in the underlying asset's market value from its pre-agreed strike price at different points until maturity.

Another possible solution involves entailing the use of conventional options. However, this solution does not only serve to hedge adverse price movements so much as it removes exposure to contingency risks (primarily those of discretionary non-performance) implied in contemporary futures, all of which is received in exchange for an up-front, non-refundable premium payment. Option use, of course, also provides opportunities to take advantage of favorable price movements.

While the premise of eliminating contingency risk is desirable under Islamic law, the assurance of definite performance through cash settlement (in futures) or mutual deferment (in options) terms commonly contained in conventional derivatives contracts is not. This is because it supplants the traditional Islamic finance concept of direct asset recourse and otherwise implies a generic zero-sum (rather than bilateral interest) proposition.

Jobst offers a way to narrow the conceptual gap noted above. By holding equal and opposite option positions with the same strike price, both parties could still be obliged to honor the terms of their underlying asset-backed contract irrespective of any periodic change in the asset's market value. The sequence of periodic and maturity-matched put and call combinations (with zero-cost structure) would then preserve the type of equitable risk sharing that is consistent with Sharia principles applicable to entrepreneurial investment.

Perhaps the most adroit conclusion shared by Jobst is that conventional futures and options are rejected by a majority of Islamic scholars on the grounds that the delivery of commodities or their possession (qabd) is not intended in most cases. With all due respect, that is almost precisely the case for energy futures and options traded at the New York Mercantile Exchange ("NYMEX"), a subsidiary of Chicago-based CME Group, as well as the IntercontinentalExchange ("ICE") in London, which together have evolved into a de-facto duopoly in the field of exchange-traded energy market derivatives.

NYMEX exploits futures and options contracts centered round a landlocked U.S. crude oil benchmark called West Texas Intermediate ("WTI"). ICE, on the other hand, exploits futures and options centered round a waterborne benchmark known as Brent, a blend of North Sea crudes. Each is claimed by exchange promoters to be a "global" benchmark, which arguably may be superficially valid but only if the criteria is gauged around average daily volume ("ADV") trading statistics.

During 2012, the reported ADV of WTI futures (1,000 barrels of crude per contract) traded at NYMEX exceeded 600,000, a level close to ICE's reported ADV for Brent futures. That means well over 300 billion barrels of gross national crude oil were subjected to NYMEX+ICE trading, a staggering level that exceeded actual WTI+Brent crude production output by a factor of more than 400-to-1 (amounts annualized). In a sheer statistical sense, virtually all parties reversed their transactions and cash settled the price difference only, a practice which in the eyes of an Islamic scholar essentially transforms a derivative contract into a paper transaction without any of the elements of a genuine sale involving physical delivery and possession.

Reaching a staggering trade-to-production multiple like 400-to-1 would be impossible without substantial interests of commodity speculators who never intend to take delivery. Ergo, the mega-trillion dollar question that fuels global consternation, not only from Islamic scholars but by the growing scores of commercial and consumer interests threatened, directly or indirectly, by the enormity of speculator influence: do they (speculators) merely provide valuable liquidity to the markets or have they essentially transformed the NYMEX and ICE (not to mention other major exchanges) into gambling casinos?

Influence of speculator interests on commodity prices, along with related exchange and regulatory oversight, have been increasingly controversial, if not heated, topics for years. More recently, tangential issues pertaining to high-frequency trading ("HFT")—a method of using super-computers and complex algorithms demanding micro-second (and less) execution by exchanges, requiring constant investment in new and advanced computer technology to gain/maintain an edge over other traders—has stirred the pot even more. Media reports estimate that HFT not only accounts for well over half of the reported trades at major exchanges but the vast majority of all bids and offers, which tend to be aggressively and systematically entered and then pulled back in such notorious HFT practices known as "spoofing", "flash trading" and "quote stuffing". HFT, alone is arguably the quintessential excuse for a Sharia-based censure of conventional futures and options use.

As a result, It seems only reasonable that an Islamic scholar would censure WTI and Brent futures and options traded at NYMEX and ICE since they (i) almost never involve delivery by their contracts' counterparties and (ii) are too dissimilar compositionally (in terms of API gravity and sulfur content), not to mention geographically, to serve as quasi-proxies for the actual physical grades of ME crude oil typically exported to the ES energy market corridor, which is heavily populated by the Muslim community.

Despite the factors noted above, it must be emphasized that not every aspect or feature embodied in a conventional exchange-traded futures or options contract is anathema to the notion of legitimate Sharia-based risk management, which is arguably needed now more than ever in the increasingly sophisticated fields of Islamic finance and investment. Additional sections presented herein will teach how certain exchange-traded energy market derivatives can be efficiently employed in an innovative manner while still satisfying substantive Sharia compliance tests.

It should also be generally recognized that market prices of so-called "landlocked" crude oil have become increasingly impacted by qualitative factors other than API gravity and sulfur content. This particularly holds true in North America (NA) where production levels have surged in the last few years and are projected to continue to increase. The relative geographic location of producer wells and terminal facilities on one hand versus customer refineries on the other, plus a slew of logistics challenges converging midstream to create bottlenecks, have spawned intermodal permutations, including those pertaining to inter alia pipeline, boat, rail and/or truck solutions, each of which is integral to current market dynamics, thus generating substantial price differentials. Such factors lend support for novel hedging instruments, such as those originally specified in the Parent Application and advanced herein, to help market participants better manage risks of price movements in the future.

Shipping markets have grown ever-riskier as fluctuations in freight rates and ship prices have increased substantially in recent years. Various instruments currently exist to hedge those risks but seldom involve the relative transparency and security of a centralized commodity exchange. Instead, the OTC derivatives agreements typically entered into for risk management purposes often employ tanker brokers—intermediaries between ship owners and the charterers who use ships to transport cargo—that specialize in crude oil, gas, oil products or chemical tankers. There is room for substantive improvement via innovative ETD instruments, particularly in the case of landlocked crude oil and other applications where intermodal permutations—including at least one of storage terminal, pipeline, boat, rail and truck—have increasingly been employed as freight solutions, the costs of which are designed to be denominated in terms of a standard container type or unit of weight (e.g., cost per ton or metric tonne).

Forward Point Differential ("FPD") Index Exchange-Traded Derivatives ("ETD") Contracts According to one particular aspect, the present teachings define a system and method of trading Forward Point Differential ("FPD") Index exchange-traded derivatives ("ETD") contracts. Such contracts represent the latest addition to a novel set of commodity trading instruments designed to complement the Exchanges' conventional and Sharia-based exchange of futures for physical delivery ("EFP") contracts, particularly those concerned with fuels (e.g., crude oil, gasoline, gasoil/diesel, residual/heavy fuel oil, natural gas and coal).

Two platform types heretofore defining the field allow commodities to be traded "forward" to hedge future production and consumption: Centralized exchange trading platforms and OTC platforms. Centralized exchange trading platforms, which transparently execute contemporaneous bids and offers, are primarily for standardized commodity futures and options contracts. Relatively opaque OTC platforms deal with agreements privately negotiated between market participants, with investment banks typically interposed as market makers that earn profits matching buyers and sellers. OTC agreements are more complex than ETD contracts so as to meet the customized needs of counterparties. However, OTC platforms offer less in terms of counterparty credit protection and price discovery efficiency and fairness. More specifically, they afford counterparties less transparency (ergo fairness) by employing "backward-looking" value assessments published by independent price reporting agencies that track samplings of their subscribers' recently consummated spot/physical market transactions (using a so-called "honor system" increasingly scrutinized by regulators around the world), rather than relying on values derived from open market bids and offers contemporaneously posted for execution over a centralized exchange.

Each platform type is explained more fully, including a comparison of their relative advantages and disadvantages, within the context of fuel commodities referenced in the present disclosure. However, a recap primarily focused on ETD is provided below.

Each exchange institution operating in the ETD market is supported by a central counterparty ("CCP") that matches buyers and sellers of contracts (the "counterparties") and arranges for all payments and settlements attendant thereto. In light of that support structure, counterparties do not incur direct credit exposure to each other. If a counterparty defaults on its ETD contract obligations, the others are protected by the CCP. In order to maintain the viability of those arrangements and enhance volume and revenue growth in the process, ETD contracts listed over centralized commodity exchanges have taken on the following attributes:

highly standardized;

revolve around exchange-designated benchmarks arbitrarily serving as proxies for multitudes of the same commodity, each having varying characteristics (e.g. Brent and WTI are touted as "global" crude oil benchmarks but actually differ—in many cases substantially—from each other and most of the several hundred grades of crude oil produced throughout the world);

virtually never settled by physical delivery because ETD daily volume and open interests are so high (especially in the case of crude oil futures)—in fact, they exceed commodity production levels by multiples in the hundreds;

specify delivery dates that are fixed and thus inflexible, which is particularly a problem for buyers and sellers of commodities that require considerable logistical arrangements (e.g., fuels);

as a result of the foregoing, ETD contracts have grown considerably more appealing to speculative rather than commercial interests, especially producers, refiners and consumers of crude oil operating in the burgeoning Middle East to East of Suez energy corridor cited, which are primary targets of this invention's workings;

ETD contracts are easily tradable (evidenced by the market's high frequency trading conundrum) and almost always result in trades being reversed for a cash pay-out prior to expiration. Conversely, OTC agreements are usually maintained to maturity, which underscores the commercial (non-speculative) appeal of customization. Clearly, the ETD field is in need of innovative solutions to enhance flexibility and customization that can attract commercial interests (new and old) away from OTC competitors; otherwise it will grow so overwhelmed with speculators that it will likely be relegated to mere "casino" status.

In summary, neither ETD nor OTC platforms, as presently configured in the field, offer all attributes desired by counterparties, especially those whose trading interests are predicated on the desire to physically deliver or take delivery of an underlying commodity. Thus, this invention has been posited as a means of providing concrete technical solutions needed to improve physical commodity trading in general and the ETD field in particular, thereby increasing the likelihood that commercial trading interests will be more willing to embrace the type of platform being taught herein.

SUMMARY

In one aspect the present disclosure relates to a computerized exchange-traded derivatives based hedging system to match, execute and settle buy and sell orders placed over an exchange-controlled network by physical delivery-oriented counterparties seeking to manage future energy price volatility risks via transparent centralized trading of commodities possessing qualifying properties within the bounds of exchange benchmark-specified sets of fuels. The may comprise:

at least one processor configured to run a plurality of non-transitory, machine executable instructions;

at least one memory in communication with the processor, the memory configured to store the non-transitory, machine executable instructions which when running on the processor are configured to:

collect data for a plurality of fuels, wherein the data include geographic locations where the fuels are discovered, a rate of extraction of the fuels, and properties of the fuels;

select fuels from the plurality of fuels based on the properties of the fuels to generate sets of fuels comprising fuel commodity benchmarks;

generate weights for generating weighted averages, wherein a weight for generating a weighted average for a fuel in a set is based on a rate of extraction of the fuel relative to an aggregate rate of extraction of the fuels in the set;

generate the fuel commodity benchmarks indicating aggregate qualities of the sets of fuels, wherein a fuel commodity benchmark for a set of fuels is generated based on weighted averages of the properties of the fuels in the set of fuels;

communicate the fuel commodity benchmarks to traders and that receives orders for derivatives contracts from the traders to buy or sell derivatives contracts based on the fuel commodity benchmarks; and wherein the order for derivatives contracts based on differences between actual properties of the fuel to be physically delivered under terms of an operative derivatives contract and aggregate qualities indicated by the fuel commodity benchmark is processed by an algorithm stored in the memory and running on the processor, the algorithm employed to compute a requisite number of long or short complementary index contracts taking into consideration attendant fuel quality variability including at least one of specific API gravity and sulfur content, with said contracts being executable for co-delivery on a settlement date of the operative derivative contract.

In another aspect the present disclosure relates to a method that may comprise:

using a processor running non-transitory machine executable instructions, and in communication with a memory, to:

collect data for a plurality of fuels, wherein the data include geographic locations where the fuels are discovered, a rate of extraction of the fuels, and properties of the fuels;

select fuels from the plurality of fuels based on the properties of the fuels to generate sets of fuels comprising fuel commodity benchmarks;

generate and store in the memory weights for generating weighted averages, wherein a weight for generating a weighted average for a fuel in a set is based on a rate of extraction of the fuel relative to an aggregate rate of extraction of the fuels in the set;

generate and store in the memory the fuel commodity benchmarks indicating aggregate qualities of the sets of fuels, wherein a benchmark for a set of fuels is generated based on weighted averages of the properties of the fuels in the set of fuels;

communicate the benchmarks to traders and receiving orders for derivatives contracts for the fuels from the traders based on the benchmarks; and process an order for derivatives contracts based on differences between actual properties of the fuel to be delivered under the terms of an operative derivatives contract and the aggregate qualities indicated by an operative fuel commodity benchmark.

Further areas of applicability will become apparent from the description provided herein. The description and specific examples provided herein are intended for purposes of illustration only and are not intended to limit the scope of the present disclosure.

DRAWINGS

The present teachings will become more fully understood from the detailed description, the appended claims and the following drawings. The details within the various views of the drawings will be understood to be drawn generally to scale. In the drawings:

FIG. 2 depicts examples of data regarding various crude oils produced in the Middle East, which underlie the aforementioned crude oil benchmarks and are subject to change from time to time;

FIGS. 10A-10B is a table that teaches the underlying logic employed by the Sharia conversion module, which converts orders placed by Sharia-based customers from a conventional derivatives mode to a Sharia-based mode or vice versa.

DETAILED DESCRIPTION

Figure 1:
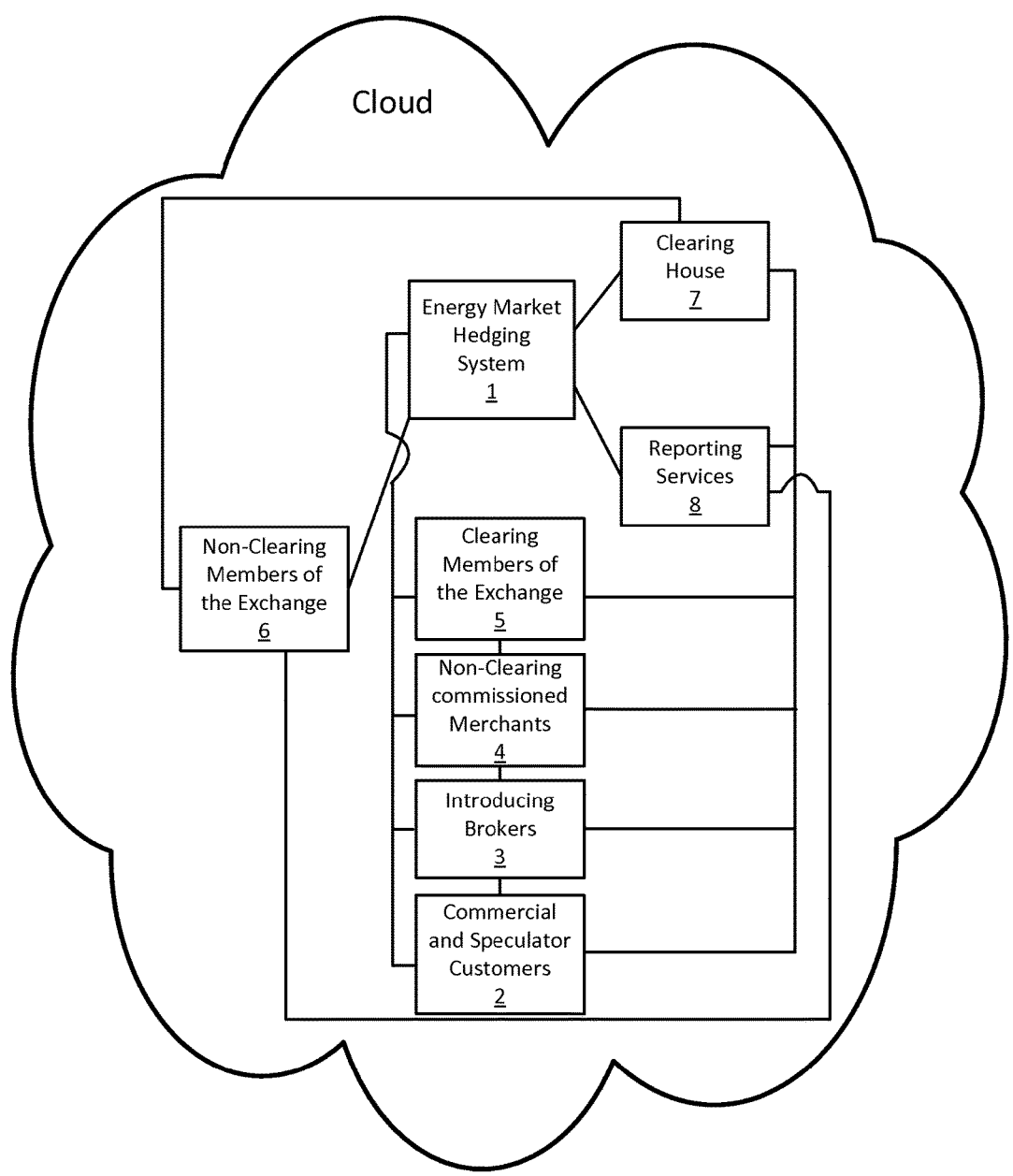
FIG. 1 illustrates the trading exchange data flow patterns using a system for energy market hedging in accordance with the present teachings.

Referring generally to FIG. 1, trading exchange data flow patterns among various parties using a system for tradable asset hedging in accordance with the present teachings is illustrated and generally identified at reference character 1. In this example the tradable assets comprise energy related assets, for example fuels, although industrial minerals and rocks (IMRs) may also form the tradable assets.

The energy market hedging system 1 is incorporated into a secure web-based Cloud network centered around the energy market hedging system 1 and involving a global energy exchange also referred to as Global Energy e-Bourse or the "Exchange". The energy market hedging system 1 may be extended to the following authorized communities of interest (COI) linked around the world over a secure web-based Cloud network: commercial and speculator customers 2; introducing brokers 3; non-clearing commissioned merchants 4; clearing members of the Exchange 5; non-clearing members of the Exchange 6; clearing house 7; and reporting services 8.

The commercial and speculator customers 2 are exposed to market price volatility of Middle East (ME) crude oils and refined products varying as to quality (e.g., API gravity; sulfur content), geographic and tanker delivery characteristics. Thus, the customers 2 seek protection against future adverse market price movements by buying and selling standardized futures, options, forwards, swaps and spreads centrally traded over the Exchange, involving the use of proprietary ME-centric benchmarks and indexes.

Entitled intermediaries engaged between those parties noted directly above and the Exchange include the introducing brokers (IB) 3, non-clearing commissioned merchants (NCCM) 4 and clearing members of the Exchange 4 that are also commissioned merchants (CMCM). However, it should be noted that although those entitled intermediaries may be engaged in commercial relationships with certain Exchange customers noted above, they are not involved as intermediaries in the chain of Exchange communications, as described more fully below. The non-clearing members of the Exchange (NCMEs) 5 may conduct proprietary trading for their own account as well as for their managed clients' accounts.

Clearinghouses 7 and reporting services 8 may be contracted by the Exchange to clear, settle and report all executed trades while ensuring that credit risks are managed via required "marks-to-market" and the maintenance of customer margin deposits, as well as (where applicable) the guaranteed deposits of CMs.

In order to acquire and maintain authorized status, COI must employ Exchange-specified contracts, benchmarks and indexes, as well as Exchange-developed hardware, software applications and processes related thereto, all supplied to COI for use over the secure web-based Cloud network so that bids and offers will be authenticated, posted and ultimately matched, executed and confirmed as trades to be cleared, settled and reported in compliance with policies and rules established by the Exchange.

Following is a description of those key elements of the web-based Cloud network which are integral to the secure and effective conduct of Exchange business. They are broken into three (3) interdependent aspects noted below, which taken together, create a fluid pool of resources across all servers and data centers enabling COI to access all that is provisioned on an as-needed and authorized basis:

Front-End:

The Exchange's front-end is globally populated by virtual servers acting as the flexible portion of the web-based Cloud network; in all, COI in more than 20 countries are expected to have virtual servers. They may take the form of users' independently employed personal computers, tablets, smart phones or even data interchange terminals tied to other trading systems (as permitted), subject to requirements that they must be (i) compatible with all Exchange-provided software applications and (ii) interconnected with an Exchange-supplied "dongle" described below. Alternatively, the Exchange can supply COI with its proprietary data interchange terminals containing the requisite software applications and dongle. Either way, front-end virtual servers inter alia perform the following functions: (a) receive all notifications from the Exchange re: the user's authorized status, as well as all software applications and updates provided by the Exchange; (b) confirm all relationships with entitled intermediaries, including the terms and conditions associated with commissions & fees (C&F), margin guarantees, etc.; (c) receive notifications from the Exchange re: all moneys payable or receivable in connection with open trades, settled trades and entitled intermediaries' C&F; (d) transmit trade orders to the Exchange in the form of bids and offers, which denote:

Commodity type (including but not limited to Crude Oil, Unleaded Gasoline, Gasoil/Diesel or Heavy Fuel Oil) or index type (Crude Oil API Gravity Value, Crude Oil Sulfur Content Value, Gasoil Quality Value, Residual/Heavy Fuel Oil Quality Value, Gasoil/Diesel Crack Spread Differential Value, Daily Transit Lease Rate for Tankers, or Daily Warehouse Lease Rate for Tankers)

Benchmark applied in the case of crude oil derived from one of several composites of oil fields located throughout the ME, computed on a weighted average (WA) basis (including but not limited to MEWA Extra Light, MEWA Light or MEWA Medium)

Terms and delivery point (if FOB: Arabian/Persian Gulf or Suez); (if CIF: various)

Type of contract (futures, options, forwards, swaps or spreads), as well as contract expiration and delivery date(s)

Settlement type: financial (cash equivalent) or physical delivery (also referred to as Exchange Futures for Physical Delivery or "EFP", which may include Salam-style transactions)

Bid or offer price and volume (in terms of number of contracts, each of which is denominated in the number of barrels or gallons or weight of the underlying commodity)

(e) receive confirmations of authorized executed trades from the Exchange; (f) receive notifications from the Exchange's clearinghouse re: required margin levels to be posted and maintained in connection with open trade positions and "marks-to-market", as well as notifications concerning clearance and settlement of trades, including details that depend on how/where they are to be settled (financially versus physical delivery); (g) receive reports of trade activity conducted at the Exchange (such as prices and volume associated with open bids and offers, as well as executed trades; and open interest and other historical trade data); and (h) receive notification of all Exchange and clearinghouse policies and rules, as well as updates concerning all Exchange-specified futures, options, forwards, swaps, spreads, benchmarks, indexes, position limits and margin requirements.

Dongle:

A dongle is a proprietary data storage hardware device loaded with software needed to inter alia provide security and authenticate the user of the dongle to virtual servers employed by the Exchange's COI. Dongles made according to Exchange specifications are supplied to COI either as (i) serialized USB thumb drives or stick devices connectable to independently employed servers, which require a PIN to reboot the server into an Exchange Cloud-enabled operating environment or (ii) an integral component of the Exchange's proprietary data interchange terminal. Dongles enable the Exchange to exercise controls over who can access what data at any given time, where data is stored and who manages the various storage needs and server networks, be they at the front or host end of the Exchange's web-based Cloud. Dongles facilitate transformational data protection via sophisticated encryption that bit-splits data from multiple slices (or shares) and adds authentication and fault tolerant information as it moves through the web-based Cloud network. This inter alia allows COI to share the same infrastructure without fear of other COI or the general population at-large accessing data that is not intended to be openly available.

Alternatively or additionally, authorized Exchange software downloads taking place at authenticated server hardware located in the Exchange's Cloud network may be used to facilitate transformational data protection described above.

Host Server:

In addition to the front-end and dongle, proprietary storage networks (aka the host server) make up the last aspect of the Exchange's web-based Cloud network. The host server is configured to accomplish the following: notify all virtual front-end servers of their authorized COI status, as well as all Exchange and clearinghouse policies, rules and updates concerning inter alia all Exchange-traded futures, options, forwards, swaps, spreads, benchmarks, indexes, position limits and margin requirements; distribute all software applications and updates provided by the Exchange to authorized COI virtual servers; receive all authenticated customer bids/offers, which are posted and matched with the posted offers/bids of other customers, resulting in confirmations of all executed trades, the data of which is also transmitted to applicable trade counterparties and entitled intermediaries, as well as to the Exchange's contracted clearinghouse and reporting service firm(s); facilitate via the Exchange's contracted clearinghouse the posting/maintenance of all required margin levels based on the attendant open trade positions; facilitate via the Exchange's contracted reporting service firm(s) the fulsome and accurate reporting of all trade activity conducted at the Exchange such as posted prices and volumes associated with open bids and offers, as well as executed open trades, open interest, settled trades and all other historical trade data; based on confirmations received from applicable COI and underlying executed trade data, compute all C&F and other charges associated with each open and settled trade, and notify all affected parties of their respective amounts payable or receivable in connection therewith; and provide a platform for account and payment management, alerts and entitlements in connection with the amounts noted directly above.

The host server is designed to be multi-faceted and scalable to sufficiently accommodate several Exchange offices posted around the world. The host server network has been designed to accommodate facilities dedicated solely to the Exchange and/or at qualified remote shared Cloud data resource centers independently contracted by the Exchange.

Accordingly, the present teachings provide a system for energy market hedging extended to authorized commercial and speculating parties that are exposed to market price volatility of ME crude oils and refined products with varying quality and geographic characteristics. The system for energy market hedging includes an all-electronic exchange platform dedicated to the transparent trading of energy derivatives, including but not limited to futures, options, forwards, swaps and spreads, all based on ME-centric benchmarks and indexes for global execution over a secure web-based Cloud network.

The system for energy market hedging of the present teachings considers the impact of proposed regulatory initiatives and enables the use of energy derivatives, such as forwards, swaps and spreads, to be traded in a manner that comports with a more stringent global regulatory environment.

In certain applications, it may be desirable to provide a system that permits execution of a derivatives trade electronically at a point somewhere in the Cloud communication chain, rather than at the host server located at the Exchange's headquarters. For example, host servers may be based in a particular country (e.g., the U.S.) to provide strategic and/or economic advantages.

Referring now to FIG. 2, a summary of Middle East-Centric Benchmarks and Complementary Indexes utilized by the system for energy market hedging is presented below. Crude oil benchmarks, each derived from a composite of ME oil fields, which are subject to change from time to time, include the following: 1) ME Weighted Average (MEWA) Extra Light Crude Oil (API gravity of 39.66° and sulfur content of 0.99%); 2) MEWA Light Crude Oil (API gravity of 33.15° and sulfur content of 1.69%); and 3) MEWA Medium Crude Oil (API gravity of 29.75° and sulfur content of 2.49%).

The system for energy market hedging further utilizes refined product benchmarks including the following: 1) Unleaded Gasoline (500 ppm sulfur), 2) Gasoil/Diesel (500 ppm sulfur) and Gasoil Crack Spread (between 500 ppm Gasoil and MEWA Light Crude Oil), and 3) Residual/Heavy Fuel Oil (35,000 ppm sulfur).

The system for energy market hedging further utilizes complementary differential value indexes including but not limited to the following: 1) Crude Oil API Gravity Value Index focused on variability of API gravity prevalent among crudes produced at ME oil fields, based on value associated with 1.00° differential; 2) ME Crude Oil Sulfur Content Value Index focused on variability of sulfur content prevalent among crudes produced at ME oil fields, based on value associated with 0.1% differential; 3) the aforementioned crude oil differential indexes are structured for trade alongside the Exchange's crude oil EFP futures, valuing variances between the selected benchmark and actual crudes delivered; fee discounts apply when said indexes are traded as designed; 4) Gasoil (Diesel) Quality Value Index (attributable to each 500 ppm of sulfur content differential); and 5) Residual/Heavy Fuel Oil Quality Value Index (attributable to each 5,000 ppm of sulfur content differential).

The system for energy market hedging further utilizes Tanker Lease Rate Indexes, which focus on variability of costs and expenses factored in tanker leases—excluding fuel costs, which can be hedged via use of the Exchange's Residual/Heavy Fuel Oil futures and options: 1) Daily Transit Lease Rate Index tied to tankers (VLCC and Suezmax, respectively) earmarked for hauling ME crude oil to East of Suez destinations; and 2) Daily Warehouse Lease Rate Index tied to tankers (VLCC and Suezmax, respectively) earmarked for warehousing ME crude oil headed to East of Suez (also able to provide Transit and Warehouse Lease Rate Indexes for smaller crude oil and refined product tankers). Futures and options are priced in U.S. Dollars; other terms—e.g., based on a Global Reserves Basket Index comprised of a variety of commodity and currency asset classes commonly employed commercially in ME and East of Suez markets—can also be provided.

The system for energy market hedging, including Salam-style transactions, further utilizes an EFP Qualification Process in which ME-Centric Crude Oil Futures are complemented by API Gravity Value and Sulfur Content Value Indexes. The EFP Qualification Process includes the following steps. Stage 1, ME crude oil meeting criteria noted below qualifies for delivery within the Exchange's assigned settlement period (per terms of respective EFP contract): To use MEWA Extra-Light crude oil benchmark, deliverable ME crude oil must be derived from an "Extra-Light" field or otherwise have API gravity >36° and sulfur content <1.4%. To use MEWA Light crude oil benchmark, deliverable ME crude must be derived from a "Light" field or otherwise have API gravity between 33° and 36° and sulfur content between 1.4% and 2.0%. To use MEWA Medium crude oil benchmark, deliverable ME crude must be derived from a "Medium" field or otherwise have API gravity between 30° and 33° and sulfur content between 2.0% and 2.9%. ME crude oil not meeting specific criteria per above may still qualify for settlement under EFP terms but must first be formally assigned an Exchange-authorized benchmark for trading.

Stage 2 (for fuel commodities meeting Stage 1 qualification): Cumulative API gravity and/or sulfur content differentials—derived by comparing actual (per Exchanged-recognized assay) and specified benchmark levels—must also be settled at delivery. This involves traders buying and/or selling, and ultimately co-delivering, long or short complementary index-based contracts, the number of which are determined by an order processing module, comprised of an algorithm employing program logic summarized below and illustrated in greater detail at section [0088]:

a. First, the algorithm identifies the extent of a trader's open long position (i.e., commitment to take physical delivery of exchange-qualified fuel) or open short position (i.e., commitment to physically deliver exchange-qualified fuel) in the operative derivatives contract, each contract being denominated in a standard unit of volume (e.g., 1,000 barrels of crude oil);

b. Next, in cases involving crude oil, the algorithm multiplies the trader's identified open long or short derivatives contract position by a factor of 1,000 times the difference between API gravity level specified in the operative fuel commodity benchmark and the actual level contained in the fuel to be physically received or delivered; upon solving that equation, the algorithm determines the extent to which the trader must buy or sell complementary Crude Oil API Gravity Value Index contracts based on the factors described below:

i. Long traders with differentials where the benchmark level is greater (i.e., more valuable) than the actual level contained in fuel to be received must sell API Gravity Value Differential Index contracts; conversely long traders with differentials where the benchmark level is less than the actual level contained in fuel to be received must buy complementary Crude Oil Gravity Value Index contracts; and ii. short traders with differentials where the benchmark level is greater (i.e., more valuable) than the actual level contained in fuel to be delivered must buy API Gravity Value Index contracts; conversely, short traders with differentials where the benchmark level is less than the actual level contained in fuel to be delivered must sell API Gravity Value Index contracts.

c. Finally, the algorithm multiplies the trader's open long or short derivatives position by a factor of 1,000 times the difference between the sulfur content level specified in the operative fuel commodity benchmark and the actual level contained in the fuel to be physically received or delivered; once that equation is solved, the algorithm determines the extent to which the trader must buy or sell complementary Sulfur Content Value Index contracts based on the factors described below:

i. Long traders with differentials where the benchmark level is greater (i.e., less valuable) than the actual level contained in the fuel to be received must buy complementary Sulfur Content Value Index contracts; conversely, long traders with differentials where the benchmark level is less than the actual level contained in the fuel to be received must sell Sulfur Content Value Index contracts; and ii. short traders with differentials where the benchmark level is greater than (i.e., less valuable) than the actual level contained in the fuel to be delivered must sell Sulfur Content Value Index contracts; conversely, net short traders with differentials where the benchmark level is less than the actual level contained in the fuel to be delivered must buy Sulfur Content Value Index contracts.

For example, assume Party A (ME crude oil producer) holds an open short position of 800 contracts of MEWA Light Crude Oil EFP Futures expiring December 2012 and agrees to deliver 800,000 barrels of ME crude assayed as having API Gravity of 34° and sulfur content of 1.89%. Thus, Party A must also transact with the Exchange in the open market and co-deliver the following at the December 2012 settlement date: 1) 680 contracts (short) of Crude Oil API Gravity Value Index Futures expiring in December 2012; computed by multiplying 800 times the difference between the benchmark)(33.15° and the actual ME crude oil delivered)(34°, or 680 contracts—in this case, short because the delivered crude is higher quality than the benchmark. 2) 168 contracts (long) of Crude Oil Sulfur Content Value Index Futures expiring in December 2012; computed by multiplying 800 times the difference between the benchmark (1.68%) and actual ME crude oil delivered (1.89%), or 168 contracts—in this case, long because the delivered crude is of lesser quality than the benchmark. Incomplete delivery of complementary index futures in the manner described above will result in Exchange-imposed cash adjustments, which are a factor of the requisite number of complementary futures called for under the circumstances and any adverse effects of post-expiration market price moves, plus applicable fees levied by the Exchange.

Figure 3:
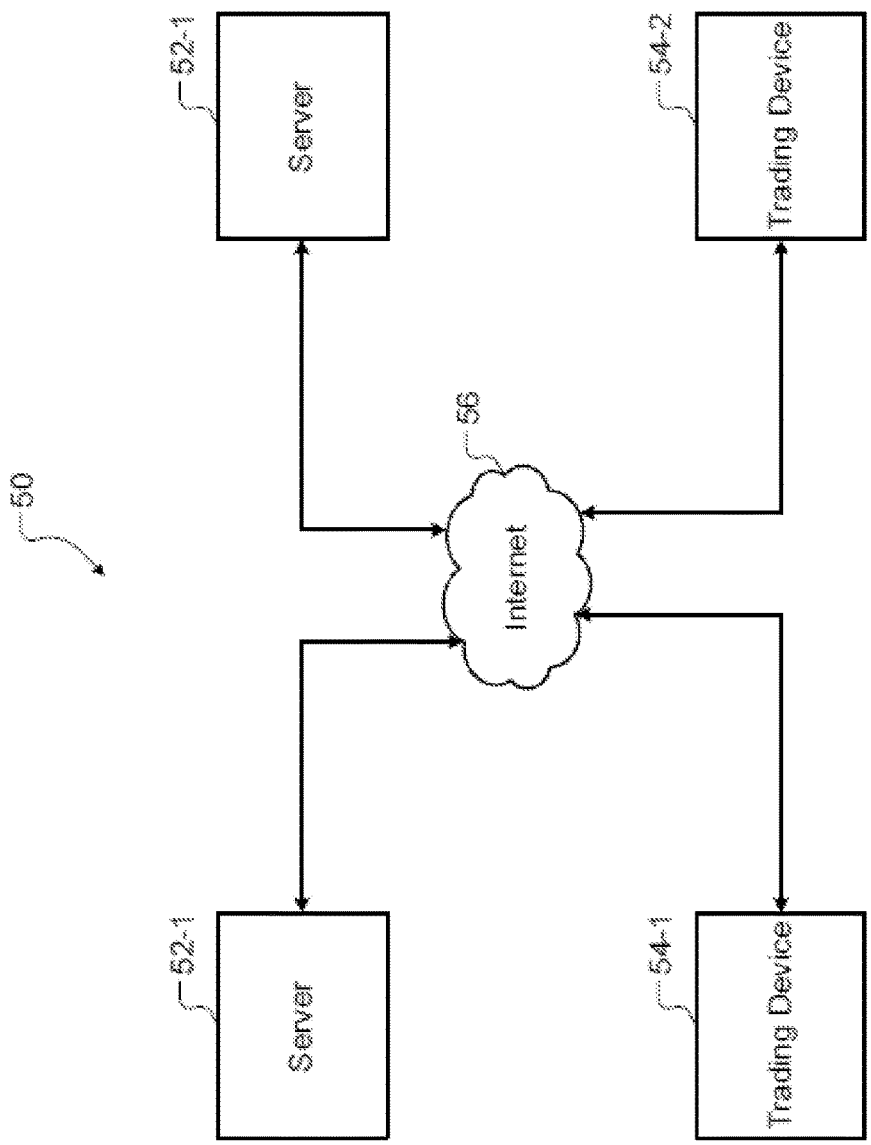
FIG. 3 is a functional block diagram of a system for energy market hedging in accordance with the present teachings.

Referring now to FIG. 3, a system 50 for trading fuels according to the present disclosure is shown. The present disclosure uses crude oils only as an example of a fuel or an energy resource. The teachings of the present disclosure may be applicable to other types of fuels or energy resources including but not limited to natural gas, coal, and so on, as well as refined products derived from crude oil. In general, the teachings of the present disclosure may be applicable to any commodity that is produced and shipped globally and that has varying properties.

The system 50 comprises a plurality of servers 52-1, 52-2, . . . , and 52-N, where N is an integer greater than or equal to 1 (collectively servers 52); a plurality of trading devices 54-1, 54-2, . . . , and 54-N; and Internet 56. The servers 52 constitute an exchange for trading the fuels. The servers 52 may be located in a single location or may be distributed in multiple locations. The servers 52 may be interconnected via the Internet 56. Alternatively or additionally, the servers 52 may be interconnected via local area networks (LANs) and/or wide area networks (WANs). The servers 52 may communicate with a plurality of fuel producers', users' and speculators' facilities via the Internet 56.

The trading devices 54 may be located all around the world and are used by traders to communicate with the exchange and to trade the fuels over the exchange. The trading devices 54 may communicate with the servers 52 via the Internet 56, a LAN, and/or a WAN.

Figure 4:
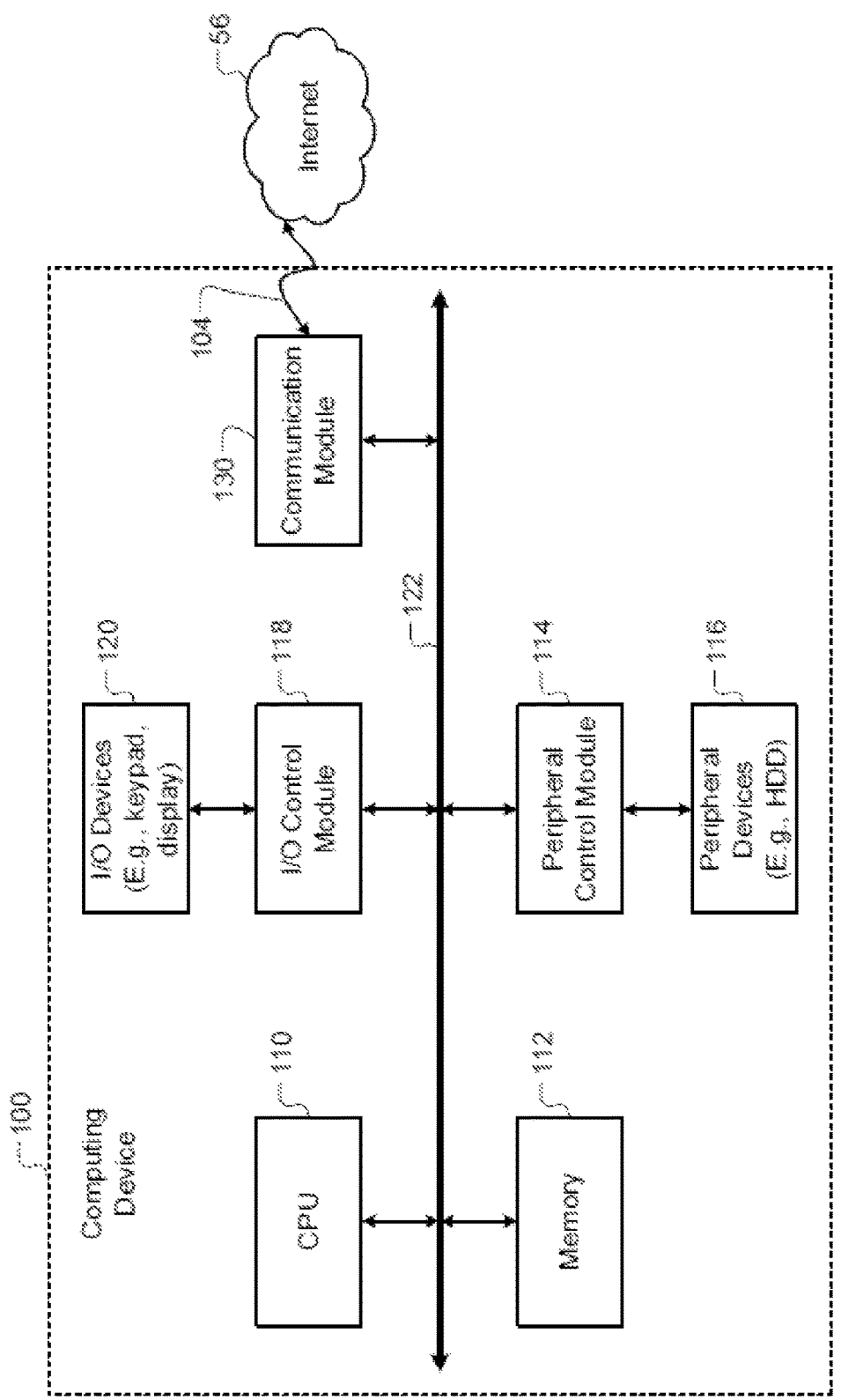
FIG. 4 is a functional block diagram of a computing device.

Referring now to FIG. 4, an example of a computing device 100 is shown. The computing device 100 may be used to implement the servers 52 and the trading devices 54. The computing device 100 may include a personal computer (PC), a laptop computer (laptop), a mobile computing device, or a mobile internet device (MID). The mobile computing device may include a smartphone, a personal digital assistant (PDA), or a tablet. The computing device 100 may communicate with the Internet 56 via a link 104. The link 104 may be wired or wireless.

In FIG. 4, only core components relevant to understanding the present disclosure are shown. It is understood that depending on configuration, the computing device 100 may include additional components not shown. For example only, the computing device 100 may comprise a central processing unit (CPU) 110, memory 112, a peripheral control module 114, peripheral devices 116, an input/output (I/O) control module 118, I/O devices 120, and a communication module 130. The CPU 110, memory 112, and other modules of the computing device 100 communicate via a bus 122.

The CPU 110 runs an operating system (OS) and application programs. The CPU 110 processes data that is transmitted and received by the computing device 100 via the Internet 56. Memory 112 stores data processed by the CPU 110 and by the other modules of the computing device 100.

The peripheral control module 114 controls the peripheral devices 116 of the computing device 100. The peripheral devices 116 may include one or more hard disk drives (HDDs), compact disc (CD) drives, and/or digital versatile disc (DVD) drives. The peripheral devices 116 store the OS and the application programs executed by the CPU 110.

The I/O control module 118 controls the I/O devices 120 of the computing device. The I/O devices 120 may include a keypad, a display, and/or a pointing device. The pointing device may include a mouse and/or a touchpad. Additionally or alternatively, the computing device 100 may include a voice recognition system. The user may interact with the computing device 100 using the voice recognition system. For example, the user may input voice commands via the voice recognition system.

The communication module 130 can communicate with the Internet 56. The communication module 130 can transmit data to Internet 56 and receive data from the Internet 56.

Figure 5:
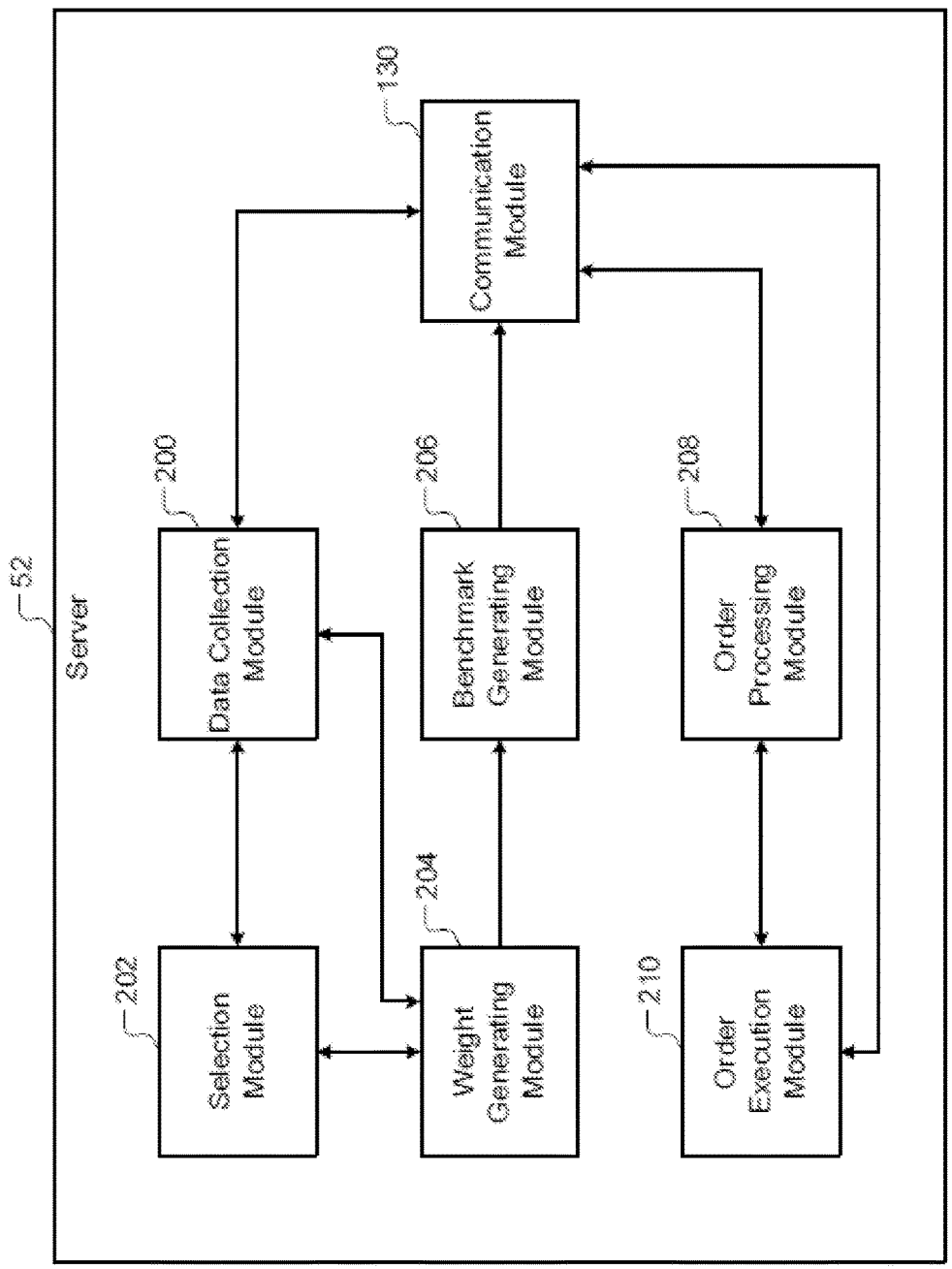
FIG. 5 is a functional block diagram of a server for the system of FIG. 3.

Referring now to FIG. 5, the computing device 100 may include the following additional modules when the computing device implements one of the servers 52. For example, the computing device 100 implementing the servers 52 may include a data collection module 200, a selection module 202, a weight generating module 204, a benchmark generating module 206, an order processing module 208, and an order execution module 210. The modules may be implemented by a combination of the hardware and software executed by the CPU 110 of the computing device 100.

The data collection module 200 collects data for a plurality of fuels. The communication module 130 may communicate with a plurality of authorized fuel production data facilities via the Internet 56 and provide the data to the data collection module 200. The data may include geographic locations where the fuels are discovered, a rate of extraction of the fuels, and properties of the fuels. The fuels may include crude oils having varying properties. The properties may include specific API gravity and sulfur content of the fuels.

The selection module 202 selects fuels from the plurality of fuels based on the properties of the fuels to generate sets of fuels. In other words, the selection module 202 groups fuels into sets based on the properties of the fuels. For example, see FIG. 2 showing crude oils grouped into three groups based on their respective API gravity and sulfur content.

The weight generating module 204 generates weights for generating weighted averages. A weight for generating a weighted average for a fuel in a set is based on a rate of extraction of the fuel relative to an aggregate rate of extraction of the fuels in the set. For example, in FIG. 2, Qatar Dukhan crude oil is extracted at a rate of 300,000 BPD, which is nearly 10% of the aggregate rate of production of nearly 3 million BPD for a set of crude oils grouped as MEWA Extra Light Crude Oil. Qatar Dukhan crude oil has an API gravity of 41.1° and sulfur content of 1.22%. Applying the weight of 300,000 divided by 3 million (i.e., 10%) to the API gravity and the sulfur content of Qatar Dukhan crude oil, the weighted API gravity and sulfur content of Qatar Dukhan crude oil becomes nearly 4.00 and 0.12%, respectively.

The benchmark generating module 206 generates benchmarks indicating aggregate compositional qualities of the sets of fuels. A benchmark (also called a fuel commodity benchmark) for a set of fuels is generated based on weighted averages of the properties of the fuels in the set of fuels. For example, in FIG. 2, the benchmarks for the MEWA Extra Light Crude Oil are a sum of the weighted averages of the properties of the constituent crude oils. That results in a benchmark having API gravity of 39.66° and sulfur content of 0.99%.

The communication module 130 communicates the benchmarks to traders and receives orders for derivatives contracts for the fuels from the traders to buy or sell derivatives contracts based on the benchmarks. The orders for derivatives contracts include futures and options, as well as forwards, swaps and spreads traded directly between the traders and fuel producers via the Exchange comprising the servers 52 and without using intermediaries in the chain of Exchange communications. The orders may also include tanker derivatives contracts related to transporting and warehousing the fuels described above.

The order processing module 208 processes an order for a fuel based on differences between actual properties of the fuel to be delivered under the terms of EFP Futures, including those that pertain to Salam-style transactions, and the aggregate qualities indicated by the operative benchmark for a set of fuels comprising the ordered fuel. See the trading example described above in detail. The order execution module 210 executes the trade and provides order execution data to the trader via the communication module 130. Executing an order encompasses orders being authenticated, posted, matched, executed and confirmed, cleared, settled and reported.

The data collection module 200 periodically updates the data such as BPD for the fuels. The benchmark generating module 206 generates the updated benchmarks based on the updated data. The communication module 130 communicates the updated benchmarks to the traders.

Figure 6:
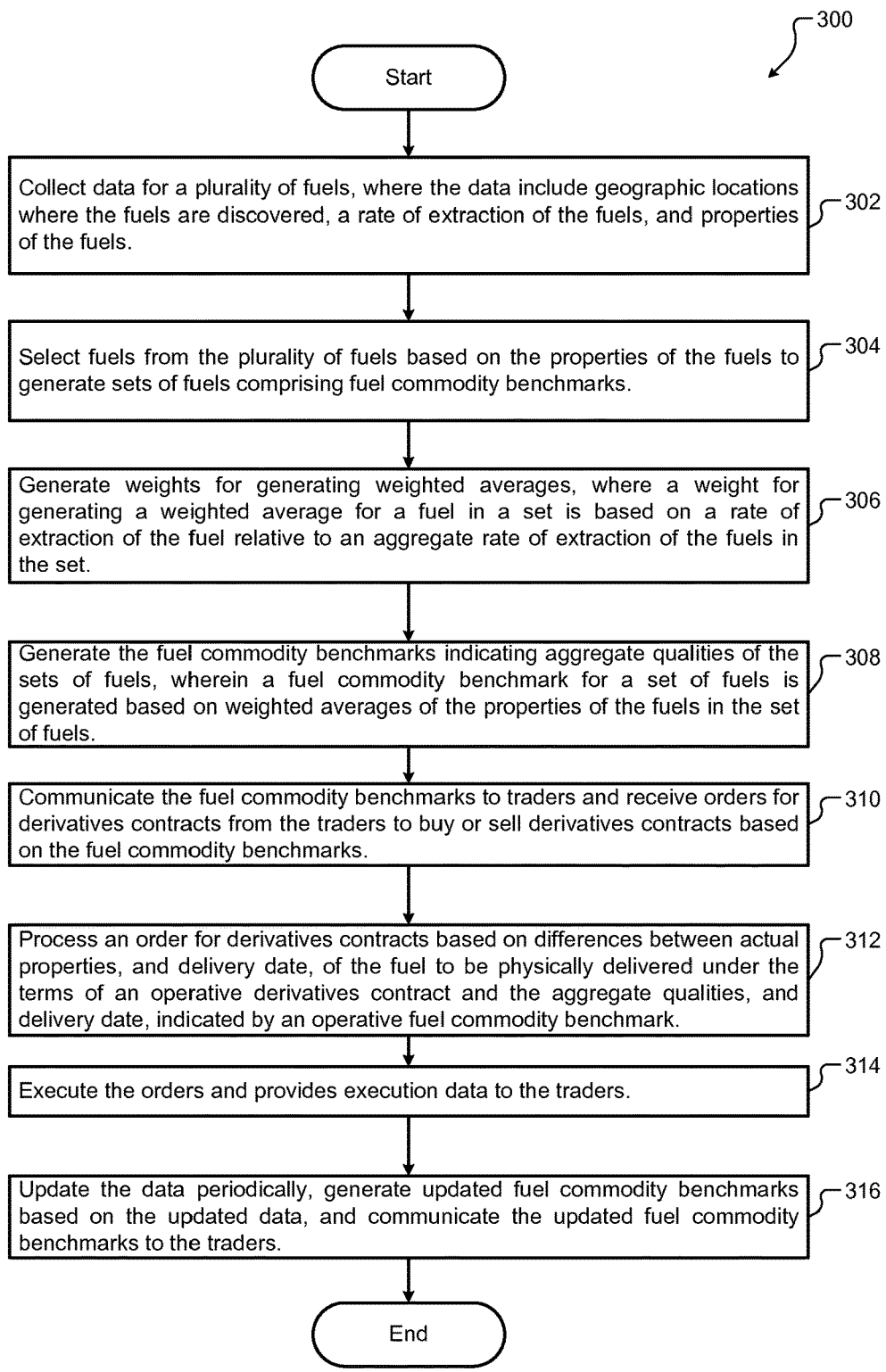
FIG. 6 is a high level flowchart of various operations pertaining to a method for energy market hedging in accordance with the present teachings.

Referring now to FIG. 6, a flowchart of a method 300 for trading fuels according to the present disclosure is shown. At operation 302, data is collected for a plurality of fuels, where the data include geographic locations where the fuels are discovered, a rate of extraction of the fuels, and properties of the fuels. At operation 304, fuels are selected from the plurality of fuels based on the properties of the fuels to generate sets of fuels. At operation 306, weights are generated for use in generating weighted averages, where a weight for generating a weighted average for a fuel in a set is based on a rate of extraction of the fuel relative to an aggregate rate of extraction of the fuels in the set. At operation 308, benchmarks are generated indicating aggregate compositional qualities of the sets of fuels, where a benchmark for a set of fuels is generated based on weighted averages of the properties of the fuels in the set of fuels.

At operation 310, the benchmarks are communicated to traders, and orders are received for derivatives contracts for the fuels from the traders to buy or sell derivatives contracts based on the benchmarks. At operation 312, an order is processed for a fuel, where the fuel is based on differences between actual properties (and delivery date) of the fuel to be delivered and the aggregate qualities (and delivery date) indicated by a benchmark for a set of fuels comprising the ordered fuel. At 312, the orders are executed, taking into account the complementary Crude Oil API Gravity Value and Crude Oil Sulfur Content Value indexes. These indexes are intended to be used in conjunction with EFP (not cash settled) futures contracts, including Salam-style transactions, and provided as execution data to the traders.

At operation 314, the data is updated periodically, and then updated benchmarks are generated based on the updated data, and then the updated benchmarks are communicated to the traders. In this manner, the method involves operations that execute orders that include futures and options, as well as forwards, swaps and spreads, including tanker contracts related to transporting and warehousing the fuels. The orders are traded directly between the traders and fuel producers over the Exchange and without using intermediaries in the chain of Exchange communications. In some implementations, the method 300 is implemented by one or more processors that execute software designed to perform the method 300.

In general, an energy market hedging system according to the present disclosure is summarized below. The energy market hedging system provides potential price protection to authorized producers and users of Middle East (ME) crude oils and refined products while also offering authorized speculators potential profit opportunities from attendant market price volatility. The system comprises globally scattered communities of interest (COI) operating over a web-based Cloud network centered around a Global Energy exchange also referred to hereafter as Global Energy e-Bourse or the "Exchange", which is the entity in charge of the following functions.

For example, the functions include specifying futures, options, forwards, swaps, spreads and other derivatives associated with the buying, selling, storing, shipping and delivery of varying grades of ME crude oil and refined products typically exported to customers in countries scattered throughout the world; listing said futures, options, forwards, swaps, spreads and other derivatives that are extended to the following COI: clearing members of the Exchange that maintain capital deposits to guarantee transactions in the event of customer defaults, non-clearing members of the Exchange, commissioned merchants, introducing brokers, trading counterparties in the form of commercials and speculators (aka Exchange customers), clearinghouses and reporting services, all of which are geographically scattered throughout the world.

Further, the functions include providing a transparent all-electronic data interchange platform able to authorize, transmit, receive, match, confirm, report, clear, settle and otherwise execute buy and sell trade orders for all listed futures, options, forwards, swaps, spreads and other derivatives with the capability of originating said orders virtually anywhere in the world over a secure web-based Cloud network; establishing all Exchange policies and rules and overseeing the compliance therewith; arranging for all trades to be cleared and settled by qualified clearinghouses; obtaining all requisite licenses and other approvals granted by applicable government regulatory bodies; and implementing all operating and reporting systems and processes conducive to the overall conduct of exchange business.

The listed futures, options, forwards, swaps, spreads and other derivatives are directly or indirectly linked to crude oil benchmarks notionally differentiated by their respective weighted average API gravity and sulfur percentage (%) content, each derived from a composite selection of crude oils produced in fields located throughout the ME region of the world, with the selection and related data being subject to change by the Exchange from time to time.

The all-electronic data interchange platform comprises a front-end, proprietary data storage hardware devices (aka dongles), and proprietary storage networks aka the host server. The front-end is populated by COI with virtual servers acting as the flexible portion of the web-based Cloud network. The proprietary data storage hardware devices (aka dongles) are loaded with software needed to facilitate transformational data protection via encryption that bit-splits data from multiple slices (or shares) and add authentication and fault tolerant information as data moves through the web-based Cloud network, allowing COI to share the same network infrastructure without fear of other COI or the general population at large accessing data that is not intended to be openly available, thereby providing controls over who can access specific data at any given time, where data is stored and who manages various storage needs and server networks. The proprietary storage networks aka the host server are multi-faceted and scalable to sufficiently accommodate several Exchange facilities around the world dedicated solely to the Exchange and/or at qualified remote shared Cloud data resource centers independently contracted by the Exchange.

The front-end virtual servers can take the form of the following: COI users' independently employed personal computers, tablets, smart phones or even data interchange terminals tied to other trading systems (where permitted) subject to requirements that they must be compatible with Exchange-provided software applications and interconnected with an Exchange-supplied dongle; or proprietary data interchange terminals made to Exchange specifications and containing the requisite software applications and dongle.

The front-end virtual servers are employed to perform the following functions: For example, the functions include receiving all notifications from the Exchange regarding the user's authorized status as well as all software applications and updates; and confirming all relationships with entitled intermediaries, including the terms and conditions associated with commissions and fees ("C&F"), margin guarantees, etc.

The functions further include transmitting trade orders to the Exchange in the form of bids and offers that inter alia denote the following: commodity type (including but not limited to Crude Oil; Unleaded gasoline; Gasoil/Diesel; or Residual/Heavy Fuel Oil) or index type, including but not limited to Crude Oil API Gravity Value, Crude Oil Sulfur Content Value, Gasoil Quality Value, Residual/Heavy Fuel Oil Quality Value, Gasoil Crack Spread Differential, Daily Transit Lease for Tankers (VLCC and Suezmax, respectively), or Daily Warehouse Lease Rate for Tankers (VLCC and Suezmax, respectively.

The functions further include transmitting benchmark in the case of crude oil derived from one of several composites of oil fields located throughout the ME, computed on a weighted average (WA) basis, which are subject to change from time to time (including but not limited to MEWA Extra Light, MEWA Light or MEWA Medium); terms and delivery point (such as FOB: Arabian/Persian Gulf or Suez; or CIF: various destinations).

The functions further include transmitting type of contract or agreement (including but not limited to futures, options, forwards, swaps or spreads), as well pertinent expiration and delivery date(s); type of settlement (financial [cash or equivalent] or physical delivery); and bid or offer price and volume (in terms of number of contracts, each of which is denominated in the number of applicable barrels or gallons or weight of the underlying commodity).

The functions further include transmitting receiving notifications from the Exchange regarding all confirmed and executed trades, moneys payable or receivable in connection with open trades, settled trades and entitled intermediaries' C&F.

The dongles are made according to Exchange specifications and supplied to COI either as serialized USB thumb drives or stick devices connectable to independently employed servers, requiring a PIN to reboot each server into an Exchange Cloud-enabled operating environment; or as an integral component of the Exchange's proprietary data interchange terminal.

The host server is employed to perform the following functions: For example, the functions includes notifying all virtual front-end servers of their authorized COI status, as well as all Exchange and clearinghouse policies, rules, and updates concerning inter alia all Exchange-traded futures, options, forwards, swaps, spreads, benchmarks, indexes, position limits and margin requirements. The functions further include distributing all software applications and updates provided by the Exchange to authorized COI virtual servers; and receiving all authenticated customer bids/offers, which are posted and matched with the posted offers/bids of other customers, resulting in confirmations of all executed trades, the data of which is then transmitted to affected trade parties and entitled intermediaries, as well as to the exchange's contracted clearinghouse(s) and reporting service firm(s).

The functions further include facilitating via the Exchange's contracted clearinghouse(s) the posting and maintenance of all required margins levels based on the attendant open trade positions; and facilitating via the Exchange's contracted reporting service(s) the fulsome and accurate reporting of all trade activity conducted at the Exchange such as posted prices and volumes associated with open bids and offers, as well as executed open trades, open interest, settled trades and all other historical data.

The functions further include, based on confirmations received from applicable COI and underlying executed trade data, computing all C&F and other charges associated with each open and settled trade, and notify all affected parties of their respective amounts payable or receivable in connection therewith; and providing a platform for account and payment managements, alerts and entitlements in connection with the payable or receivable amounts noted directly above.

The trade margining, marks-to-market, clearing and settlement functions are facilitated by qualified clearinghouses consisting either of an affiliate of the Exchange or independently contracted clearinghouse(s), each being COI in the web-based Cloud network.

Turning now to FIGS. 7-10B, teachings of various aspects concerning a system and method of the present disclosure for Sharia-based energy market hedging and related method are provided below as follows. It will be understood that the system discussed in connection with FIGS. 7-10B may be used to augment the capabilities of the energy market hedging system 1 shown in FIG. 1.

Initially, trading deals solely with permitted (halal) commodities, including but not limited to those typically underlying commerce between producers and users of ME/ES crude oil and refined products. The specifications for those commodities are key factors integral to the configuration of the Exchange's benchmarks, complementary indexes and derivatives contracts (e.g., futures, options, forwards, swaps and spreads), each of which is effected by the Exchange's proprietary information technology ("IT") system modules taught more fully in U.S. Patent Application No. 61/513, 792, namely: (i) the data collection module; (ii) the selection module; (iii) the weight generating module; (iv) the benchmark generating module; (v) the communication module; and (vi) the order processing module.

Figure 7:
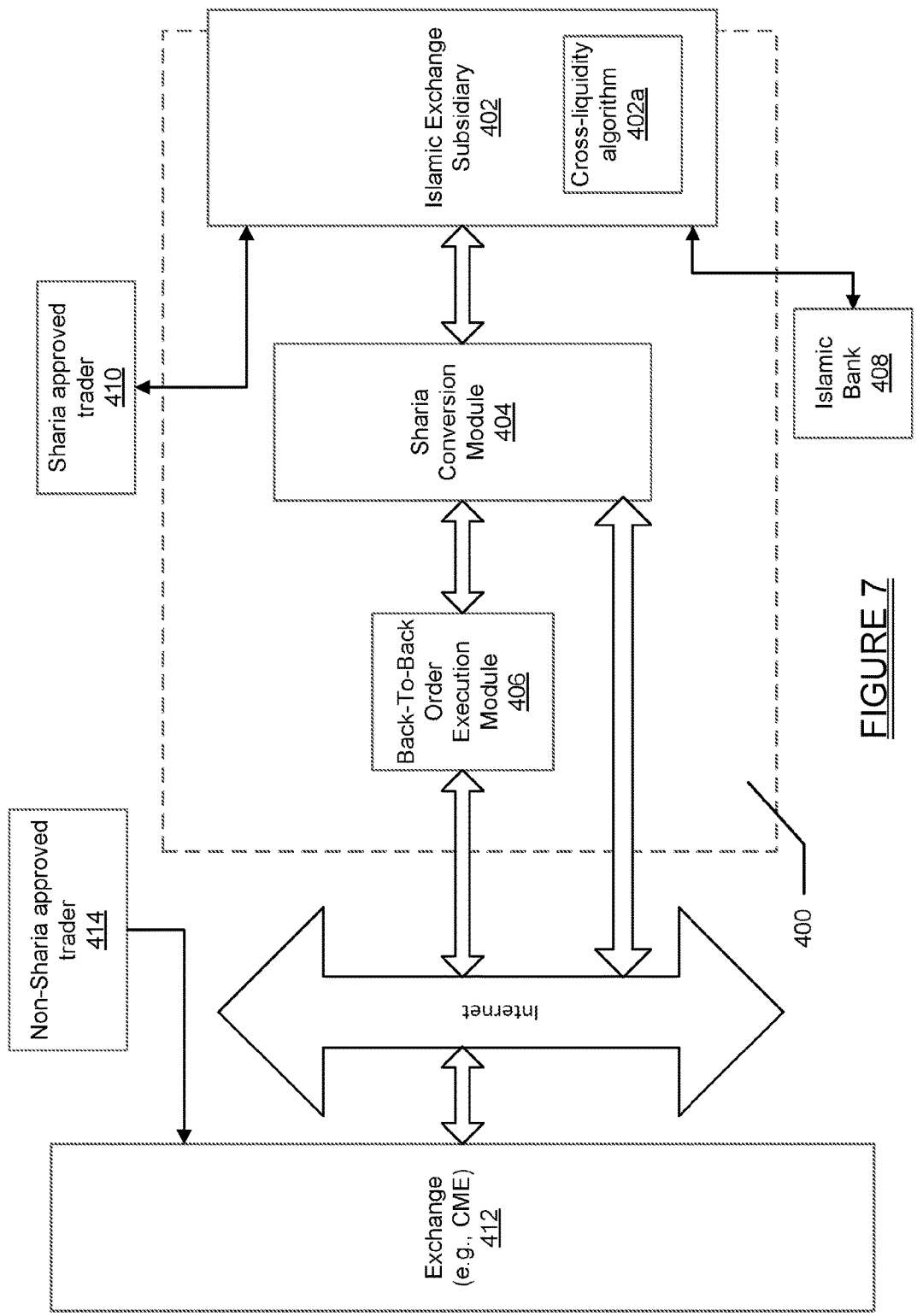
FIG. 7 is a high level block diagram of one example of a Sharia compliant energy commodity trading and risk hedging system in accordance with the present disclosure, and showing how the Sharia compliant system may be incorporated into a secure, web-based Cloud network serving both the Exchange and the Islamic Exchange Subsidiary (IES) and their respective communities of interest.

Referring to FIG. 7, there is shown a Sharia-based energy market trading and hedging system 400 (hereafter simply the "system" 400) in accordance with one embodiment of the present disclosure. The system 400 may include an Islamic exchange subsidiary ("IES") 402, a Sharia conversion module 404 (both hardware and software), and a back-to-back order execution module 406 (also both hardware and software). The IES 402 makes use of a suitable cross-liquidity algorithm 402a for the purpose of consolidating bids and offers from the Exchange and the IES in order to enhance IES liquidity. The algorithm 402a is based on several essential elements including but not limited to the following: (i) IES tick volume, which is the number of changes in a Sharia-based ETD's bid and offer price posted by different IES traders within a given time interval; (ii) the IES tick volume price differential between the lowest bid and the highest offer during the same given time interval; (iii) an optimal IES tick volume threshold level established by the IES for a similar time interval; and (iv) an optimal IES tick volume price differential established by the exchange for a similar time interval. Factors pertaining to (i) and (ii) are divided into factors pertaining to (iii) and (iv), thereby arriving at a percentage. If that percentage deviates from a certain level or range established by the IES, it triggers back-to-back execution(s) as will be described herein. Islamic based financial institutions, such as an Islamic bank 408, have previously authorized access to the IES 402 as do previously approved, Sharia-based (i.e., Sharia compliant or preapproved) traders 410. The system 400 is in communication with a wide area network, for example the Internet, by which the Exchange 412 and the IES 402 can be accessed. Of course, non-Sharia approved traders 414 may also access the Exchange 412.

Use of the aforementioned IT system modules 202-210 described in connection with FIG. 5, and in particular the order processing module 208, may be instrumental to the system 400 of the present disclosure in a plurality of ways. The first is the novel manner in dealing with the impact of typical commercial trade-offs between (i) actual properties of the fuel to be delivered under the terms of an operative derivatives contract and (ii) aggregate qualities indicated by an operative fuel commodity benchmark referenced in said contract.

The order processing module 208 is designed to employ the effects of one or more of the Exchange's 412 proprietary complementary indexes, which results in financial adjustments being made to adequately compensate for inter alia API gravity and/or sulfur content differentials between physically deliverable and benchmark grades of fuel. This innovative teaching provides substantive means to assuage Sharia-based concerns with regard to issues of (i) traders' intent to either deliver or take delivery and hold (as the case may be) and (ii) double coincidence, which in each case may be overcome by the Exchange's unique ability to match Exchange-For-Physical ("EFP") buyers with EFP sellers having practically, rather than absolute, opposite hedging interests, including but not limited to those engaged in Salam-style transactions.

Trading of the Exchange's 412 derivatives contracts may be executed by the IES 402 which acts as a subsidiary exchange to serve as a Sharia-based energy trading platform focused on orders placed by parties qualified by Sharia ruling bodies. Such qualified parties may include inter alia (i) commercial producers and users of ME/ES crude and refined products; (ii) Islamic banks, brokers or other intermediaries that typically engage with customers who legitimately purchase and sell ME/ES crude or refined products in the normal course; and (iii) Islamic investment companies, funds or vehicles that are permitted to own and hold ME/ES crude or refined products.

In some cases, it may be advantageous for the Exchange 412 and the IES 402 to function as back-to-back order executers, a structure that is designed to broaden the net in matching Sharia-based buyers and sellers at the IES 402 with compatibly offsetting orders coincidentally posted by other (not Sharia-based) customers at the Exchange 412, thereby enhancing market liquidity at each exchange. The back-to-back order execution module 406 operates co-operatively with the Sharia conversion module 404 to consolidate both exchanges' bids and offers for ultimate execution at the IES 402 pursuant to the cross-liquidity algorithm 402a that factors the relative order flow of each exchange 402 and 412. This is discussed further in the following paragraphs.

Once the IES 402 is officially notified that a party qualifies for Sharia-based trading, that party is eligible to become an IES community of interest ("COI") registrant. Such registration entails extension of the system's 400 proprietary capabilities on a restricted/controlled basis via the following embodiments: (i) the front-end, which is globally populated by virtual servers belonging to its registrants, thereby acting as the flexible portion of a web-based (Cloud) network that is capable of integrating inter alia existing personal computers, tablets, smart phones, and order entry terminals (including those that are proprietary and others tied to rival platforms); and (ii) dongles, which are operable in either a hardware or downloadable software format and integral to all transformational data protection and management functions, thereby authenticating and otherwise providing security, as well as ongoing exchange access controls, to each registrant's virtual server(s) connected within the COI.

Figure 8:
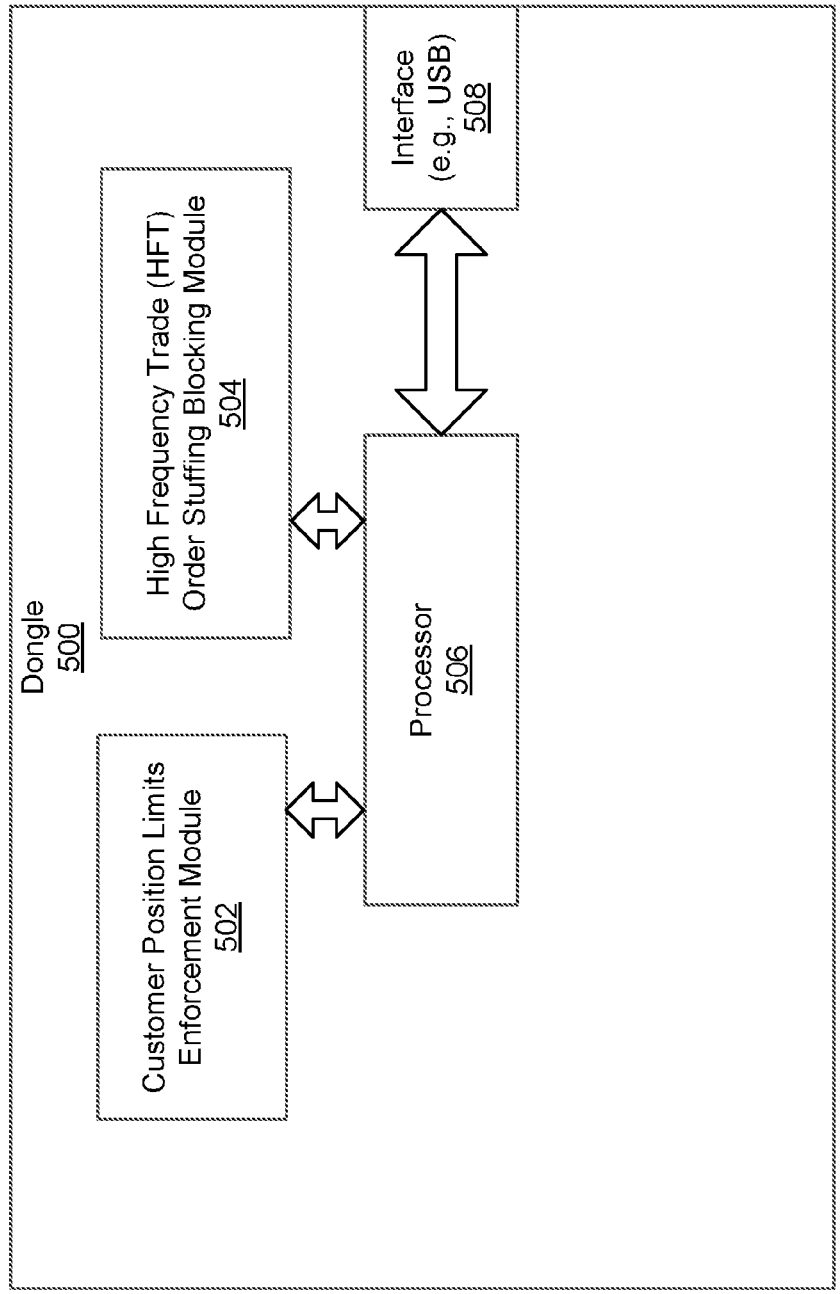
FIG. 8 is a high level block diagram of a customized dongle that may be used with the Sharia compliant energy commodity trading and risk hedging system of FIG. 7.

With brief reference to FIG. 8, a dongle 500 is shown for use with the system 400. The dongle 500 may be interfaced with a computing device (e.g., laptop, desktop, etc.) that is being used by an individual or institution to access the IES 502. The dongle 500 may include a customer position limits enforcement module 502 and a high frequency trade order stuffing block module 504 that are both in communication with a suitable processor 506. The processor 506 may communicate with its host device (i.e., laptop, desktop, tablet, etc.) via a suitable interface circuit 508, such as a USB interface or even a Bluetooth® wireless connectivity interface. The dongle 500 enables the Exchange 412 and the IES 402 (as the case may be) to control "who" can access "what" at any given point. This helps to ensure that only Sharia compliant trades are executed over the IES 402. This feature can be further customized to regulate IES traders that are financial investors or even speculators (if their use may ever be sanctioned by Islamic scholars). Such customization may involve imposing enforceable position limits for each IES trader (via the enforcement module 502) as part of measures designed to establish and maintain market functionality and liquidity within the bounds of what may be deemed by Sharia scholars as reasonably constructive (and thus allowable). Customization may also involve instilling HFT order stuffing blockades, which are implemented via the blocking module 504 that inter alia measure and restrict the number and size of orders placed by, withdrawn by, placed again in a repetitive fashion by, and ultimately executed for, the same IES trader within a certain period of time, all of which may designed to take place as part of an intentional trading pattern deemed by the IES 402 to be disruptive and/or unfair to other IES traders, not to mention censurable by Islamic scholars.

It will be appreciated, then, that a central feature of the system 400 involves the Sharia conversion module 404. The scope of the Sharia conversion module 404 is multi-faceted. For one, it effectuates the registration of IES COI members upon official notice from recognized Islamic scholar(s), referred to hereafter as "RIS". The Sharia conversion module 404 also operates to convert orders placed by Sharia-based customers from a conventional derivatives mode to a Sharia-based mode or vice versa, depending on the circumstances. Still further, the Sharia conversion module 404 triggers the use of the back-to-back order execution module 406, which involves engaging both the Exchange 412 and IES 402 in cases where the effects of their respective order flows can be consolidated in order to enhance IES 402 liquidity without delegitimizing any of its Sharia-based transactions.

As noted above, the Sharia conversion module 404 may convert orders placed by Sharia-based customers from a conventional derivatives mode to a Sharia-based mode or vice versa. FIGS. 10A-10B is a table that teaches the underlying logic associated with that conversion process.

Figure 9:
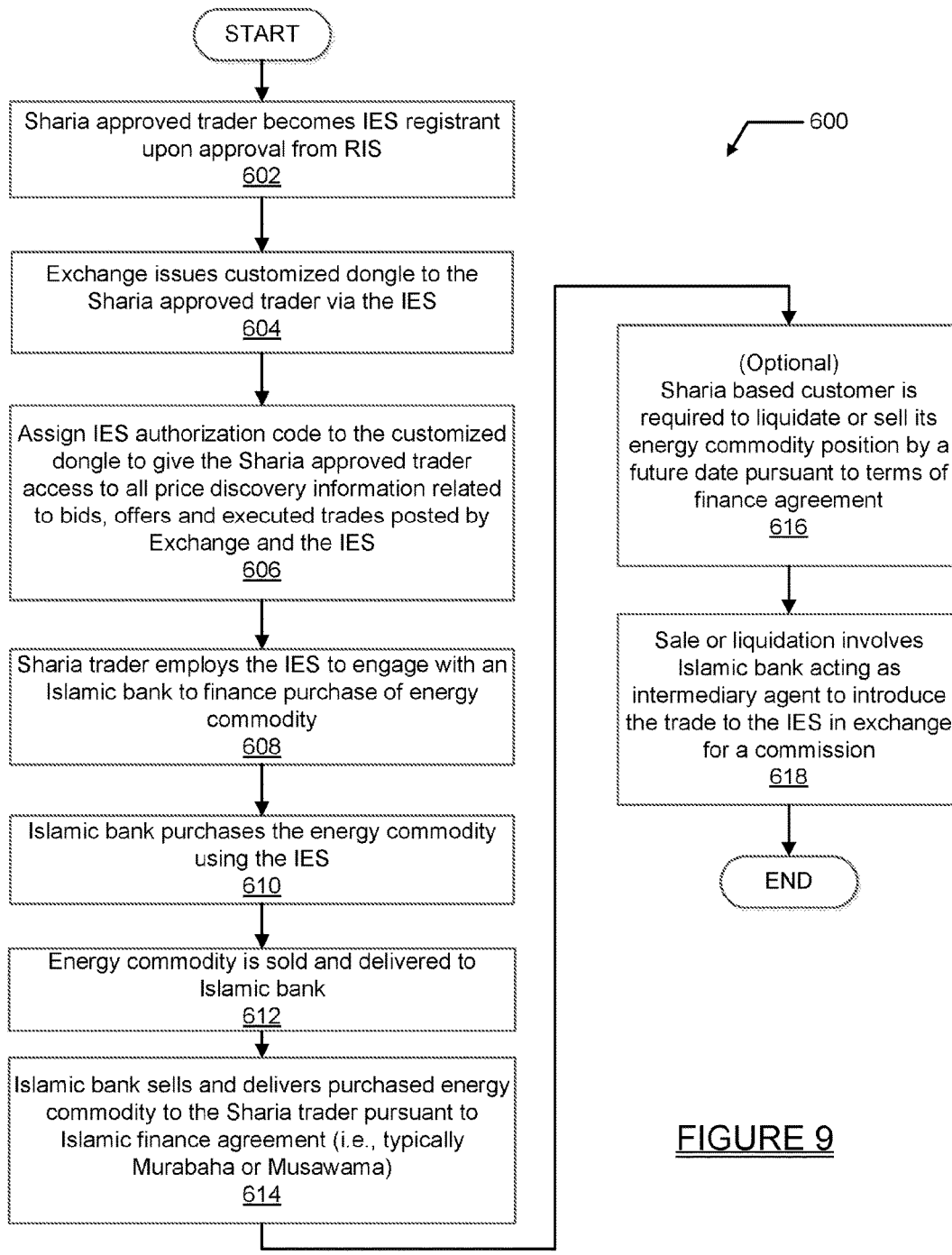
FIG. 9 is a high level flow chart that illustrates one example of a sequence of operations that may occur when the Exchange and IES are used to engage in back-to-back order execution to enhance order flow liquidity.

Referring now to FIG. 9, a flow chart 600 is shown setting forth one example of a sequence of operations that may be carried out by the system 400. At operation 602, upon official affirmation from the RIS, a Sharia-approved trader becomes an IES 402 registrant. At operation 604 the Exchange 412 may issue the dongle 500 via the IES 402 to the Sharia-approved trader. The Sharia-approved trader may be comprised of either the Islamic Bank 408 or a Sharia-approved trader 410 (i.e., an individual or entity). As such, the Islamic bank 408 or Sharia-approved trader 410 may represent any one of a commercial entity, an investor entity or a speculator entity. At operation 606 the dongle 500 is assigned an IES authorization code which grants the IES registrant access to all reported data concerning bids, offers and executed trades posted by the Exchange 412 and the IES 402, respectively (with data connected with the former providing valuable price discovery information supplementing the latter).

The dongle 500 may also be employed to curtail speculators by establishing and maintaining customer position limits and instilling HFT order stuffing blockades, as described herein.

The back-to-back execution module 406 (FIG. 7) operates co-operatively with the Sharia conversion module 404 in cases where it is beneficial to consolidate the bids and offers of both exchanges 412 and 402 for the purpose of enhancing the liquidity of IES 402 order flow. Such a process factors the prevailing relative order flow of each exchange and, if necessary, triggers a back-to back order execution. When a back-to-back order execution is triggered the Exchange 412 or the IES 402 becomes a counterparty to its primary customer trades, and then simultaneously enters into an offsetting Sharia-compliant trade with the other/affiliated exchange (IES 402 or the Exchange 412, as the case may be).

At operation 608 the Sharia-approved trader 410 may employ the IES 402 to engage with an Islamic Bank 408 to finance its purchase of the attendant energy commodity. At operation 610, the energy commodity may first be purchased by the Islamic bank using the IES 402. At operation 612 the energy commodity may be sold and delivered to the Islamic bank 408 using the IES 402. At operation 613 the Islamic Bank 408 may sell and deliver the purchased energy commodity to the Sharia-approved trader 410. The sale and delivery at operation 614 is made as part of an Islamic finance arrangement, typically taking the form of a Murabaha or Musawama, whereby the parties use the IES 402 to settle on the purchase price to be paid for the energy commodity, as well as mutually agreeable deferred payment and profit sharing terms.

Depending on the terms of the underlying Islamic finance arrangement mentioned above, at operation 616 the Sharia-approved trader 410 may ultimately be required to liquidate or sell its energy commodity position by a future date. This action may be specified as part of the aforementioned deferred payment schedule terms agreed to with the Islamic Bank 408. At operation 618, the liquidation in this example requires an intermediary agent, for example the Islamic Bank 408. The Islamic bank 408 acts as the intermediary agent to introduce the trade to the IES 402 in exchange for a commission.

During the period when the Sharia-approved trader 410 holds the energy commodity, prior to repaying the Islamic Bank 408 in full, both parties may be exposed to potentially unfavorable movements in the market price of the commodity. This may prompt the parties to hedge the potential market price risk, which may be achieved by the Sharia-approved trader 410 selling an EFP futures contract, including those pertaining to Salam-style transactions, over the IES 402.

In some cases, in addition to or in lieu of an EFP futures contract such as that noted above, the Islamic Bank 408 and the Sharia-approved trader 410 may mutually agree that a hedge should occur via IES-executed wa'ad agreements. In such an instance, the parties would hold equal and offsetting option positions having maturity-matched put and call combinations intended to preserve the type of equitable risk sharing that is consistent with Sharia principles.

With further reference to the spreadsheet of FIGS. 10A-B, it will be appreciated that the following notes are applicable.

Note 1

Customers 410 engaging in Musawama (trading where Buyers bid and Sellers offer before settling on the contract price without knowing the commodity's actual cost) may do so in the spot market either at the Exchange 412 or at the IES 402.

The IES 402 should be used to execute Musawama trades when the Islamic bank 408 is engaged to finance the underlying commodity's purchase, similar to cases involving Murabaha.

Any Customer 410 not engaging an Islamic bank, and who instead elects to trade at the Exchange 412, is subject to the same Exchange rules as any other (non Sharia-based) trader.

Note 2

It will also be appreciated that customers 410 buying commodities per Sharia-based Murabaha (Islamic financing) should do so at IES 402 in a process that engages both the customer 410 and the Islamic bank 408. In cases of IES-executed Murabaha, both the customer 410 and the Islamic bank 408 agree to the market price paid for the underlying commodity, as well as the deferred payment method being used to cover the commodity's cost plus a mutually agreed profit for the Islamic bank.

If both Murabaha parties agree to hedge the underlying commodity's prospective price movement risk via futures contracts, such hedging transactions may also be executed at the IES 402.

Musawama traders 410 financed by an Islamic bank 408 are generally subject to the same rules as those for Murabaha. In the case of either Sharia-based type (Murabaha or Musawama), the IES 402 may trigger a back-to-back order execution process with the Exchange 412 in an effort to enhance market liquidity by broadening the net of order flow.

Note 3

In cases involving Sharia-based Murabaha or Musawama, the customer 410 and the Islamic bank 408 may want to hedge the contingency risks implied in any outstanding futures contracts. If so, the parties may enter into a bilateral (or reciprocal) Sharia-based wa'ad where the customer 410 and the Islamic bank 408 hold equal and opposite wa'ad positions with the same strike prices. Notwithstanding the above, the customer 410 and the Islamic bank 408 are still obliged to honor all terms of their Sharia-based asset-backed contract irrespective of any periodic changes in the underlying asset's market value.

All sequencings of periodic and maturity-matched wa'ad put and call combinations (referred to as a reciprocal zero-cost structure) are intended to preserve the type of equitable risk sharing that is consistent with Sharia principles applicable to entrepreneurial investment.

Note 4

It will also be appreciated that all transactional payments and settlements occurring under IES-executed contracts in the spot and futures markets, as well as (where applicable) with any related wa'ad agreements, should involve the use of qualified IES escrow accounts. The form, nature and amounts of such accounts are also subject to the RIS sanctioning process.

Technical Solutions Aimed at Improving the ETD Field

As taught herein, FPD Index contracts are designed to work synergistically with the system 50 or system 400's bench-marking systems and methods, as well as other complementary index contracts as disclosed herein, to create technical processes needed to inter alia transparently value quality and logistics variability unique to commodity ETD settled via physical delivery over centralized execution platforms designed for that purpose. When all of the embodiments forming this invention work together, they yield unprecedented technical solutions that will improve physical commodity trading in general and the ETD field in particular (especially for the energy sector). Below is a summary of the various significant solutions derived from the synergistic aspects of this invention.

The various embodiments of the invention described herein overcome the major disadvantage of conventional ETD, that being inflexibility stemming from the use of standardized contract specifications. Such standardized contract specifications may include, without limitation, (a) exchange-designated benchmarks deemed by many to be arbitrary and flawed when employed as "global" proxies and (b), delivery dates that are restrictive for commercially oriented traders dealing with complex logistics considerations.

The various embodiments of the invention described herein also maintain the major advantages of a conventional ETD, namely: (a) counterparty credit protection afforded by the use of CCP and (b) order execution transparency, resulting in enhanced price discovery, afforded by the use of a centralized exchange.

The various embodiments of the present invention also employ state-of-the-art IT in an unprecedented manner via special computer processes and algorithms drawn from the teachings presented herein, which enable the Exchanges and their counterparties to deal with the integrative complexities of the novel set of synergistic ETD tied to benchmarks and complementary indexes taught, all designed for contemporaneous trading in the open market. Thus, counterparties in need of flexible hedging tools predicated on physical delivery will obtain customization along the lines of that previously afforded only by private OTC agreements, a key issue for diverse range of commercial traders around the world that have so far been unable (due to their inability to find a counterparty with absolute opposite trading interests) or unwilling (due to Sharia-based issues of non-compliance) to embrace ETD as a means of commodity hedging. The solution employed by the various embodiments of the invention is to employ unprecedented systems and methods to match Exchange counterparties with practically (rather than absolute) opposite hedging and trading interests that can be reconciled via the synergistic use of integrative benchmarks and complementary indexes that are uniformly applied to construct a desired level of customization, as explained further below.

A benchmark taught by the present disclosure is not any single commodity form closely specified to enhance trading prospects (e.g., WTI crude oil at Nymex), as a proxy for all forms of the Exchanges' listed commodity, but rather, the exchanges established by the embodiments of the invention set forth concrete benchmark limitations relating to a plurality of operations defined (for fuel commodities) via specific modules, as specified herein. These modules include the following:

the data collection module 200, which selects fuels from a plurality of fuels based on specific predetermined properties of the fuels to generate sets of fuels comprising fuel commodity benchmarks;

the weight generating module 204, which generates weights for generating weighted averages, wherein a weight for generating a weighted average for a fuel in a set is based on a rate of extraction of the fuel relative to an aggregate rate of extraction of the fuels in the set; and the benchmark generating module 206, which generates the fuel commodity benchmarks indicating aggregate qualities of the sets of fuels, wherein a fuel commodity benchmark for a set of fuels is generated based on weighted averages of the properties of all the fuels in the set of fuels.

Using the multi-faceted processes implemented by the modules described above, as developed for fuels, each Exchange for example is able to match Kuwaiti Export sellers with Iraq Basrah buyers, since each crude oil form is complementary with the other as a member of the set comprising the Middle East Weighted Average Medium Crude Oil Benchmark.

The order processing module 208 processes ETD bids/offers tied to operative benchmarks (per above) and complementary indexes—unprecedented in the ETD field—such as those described below (again re: fuel commodities) so that the traders either pay or receive compensation for differences between benchmark-specified and actual grades of the commodity being physically delivered or received as of the contract's settlement date. The complementary indexes are:

API Gravity Differential Indexes, which are focused on variability of API Gravity prevalent among crudes produced at oil fields that are members in a set of crude oils specified in the Exchanges' attendant benchmark; based on value attributed to a 1.00° differential selected as the optimal complementary denominator for diverse counterparties having practically opposite interests.

Sulfur Content Differential Indexes applicable to inter alia crude oil, gasoil/diesel and residual/heavy fuel oil, which are focused on variability of sulfur content prevalent among the applicable fuels specified in the Exchanges' attendant benchmark; based on the respective values associated with the following optimal complementary denominators: 0.1% for crude oil; 500 parts per million for gas oil/diesel; and 5,000 parts per million for residual/heavy fuel oil.

Tanker Lease Rate Indexes, which are focused on the variability of daily costs and expenses factored in tanker leases used to transport fuels over sea routes, excluding fuel costs that can be hedged via use of the Exchanges' residual/heavy fuel oil ETD contracts.

Forward Point Differential Indexes, which are described in more detail below.

C. Further Description of Workings of the Present Disclosure

FPD Index ETD contract prices are structured for quotations on a per diem differential basis, selected as an optimal complementary denominator to match the widest most diverse range of EFP counterparties' coincidence of wants (i.e., orders), particularly those placed by commercial traders. Such a structure is designed to practically match complementary coincidence-based forward delivery date requirements, rather than absolutely coincidence-based requirements (the latter being the most limiting method commonly employed by conventional ETD outlets focused more on commodity financialization and speculative interests). Practical complementary quote matching combined with transparency resulting from ETD orders being contemporaneously posted, matched and executed over the Exchanges is aimed at benefiting commercial traders by enhancing liquidity and market depth.

Next, each FPD Index ETD contract is quoted in terms of an expiration month "pair" (e.g., January-February, February-March, March-April, etc.) with the front month of each pair conforming to that specified for the underlying EFP contract's scheduled expiration.

Lastly, the requisite number of complementary "long" or "short" FPD Index ETD contracts to be co-delivered at settlement along side the underlying EFP contracts is computed by the system 50 or the system 400 and communicated to each trader based on the following factors:

each trader's open "long" or "short" underlying EFP contract position;

the number of trading days (forward) between the underlying EFP contract's specified expiration date and the trader's desired delivery date—with both dates falling within the attendant month "pair" specified by the FPD Index ETD contract; and the extent to which the trader's underlying EFP contract's then-prevailing forward price curve reflects either a contango or backwardation market. Those skilled in the art of commodities trading will understand that "contango" is a market condition where forward prices exceed spot prices, so the forward price curve is upward sloping. Conversely, "backwardation" is a market condition where spot prices exceed forward prices.

D. Examples

Examples provided herein extend those presented hereinbefore in Patent Application Publication No. US 2013/0036039 A1 dated Feb. 7, 2013. Thus, the hypothetical time frame in these examples involves dates from the past, which recognizes the aged nature of the published application's contents.

First, assume that Party A (ME crude oil producer) holds an open "short" position of 800 contracts of MEWA Light Crude Oil EFP Futures expiring December 2012, thus agreeing to deliver 800,000 barrels of qualifying ME crude.

Next, assume that expiration dates for MEWA Light Crude Oil EFP Futures contracts specify the third Thursday of each month preceding the expiration month named in the Exchange listing. Thus, in the example provided above, the operative expiration date would be Nov. 16, 2012.

Next, assume that the operative expiration date for the next Exchange-listed month (January 2013) would be Dec. 20, 2013. Thus, the total number of trading days between the respective expiration dates of the operative Exchange-listed month "pair" amounts to 24 trading days.

Next, assume Party A desires to actually deliver 800,000 barrels of MEWA Light Crude Oil on Wednesday Dec. 12, 2012—18 trading days after its operative underlying EFP contract's specified expiration date of Nov. 16, 2012 (note: Thanksgiving 2012 falls within the intervening period).

Next, assume that when Party A decided to designate Dec. 12, 2012 (rather than Nov. 16, 2012) as its actual (desired) delivery date to settle its 800 contracts (800,000 barrels) "short" underlying EFP position, the MEWA Light Crude Oil EFP market was experiencing a contango condition—with the December 2012 contract being quoted at $107.50 per barrel and the January 2013 contract being quoted at $108.23 per barrel ($0.73 higher or ~$0.03042 higher on a per diem differential basis, factoring 24 intervening trading days). Considering that each FPD Index ETD contract is denominated in terms of the actual (desired) number of days forward (16) times the number of underlying EFP contracts (800), it is assumed that Party A would "short" (offer for sale) 12,800 contracts of December 2012 MEWA Light Crude Oil FPD Index in the open market at a price of ~$30.42 or higher (1,000 times the per diem price differential of $0.03042). Party A's 12,800 "short" December 2012 MEWA Light Crude Oil PFD Index contracts would then be delivered for co-settlement along with Party A's 800 "short" underlying December 2012 EFP contracts as of Nov. 16, 2012.

Conversely, assume that when Party A decided to designate Dec. 12, 2012 as its actual (desired) delivery date, the MEWA Light Crude Oil EFP market was experiencing a backwardation condition—with the December 2012 contract being quoted at $107.50 per barrel and the January 2013 contract being quoted at $106.92 per barrel ($0.58 per barrel lower or ~$0.02417 less on a per diem differential basis, factoring 24 intervening trading days). Considering that each FPD Index ETD contract is denominated in terms of 1,000 times the number of actual (desired) days forward (16) times the number of underlying EFP contracts (800), it is assumed that Party A would attempt to go long (bid to purchase) 12,800 contracts in the open market at a price of $24.17 or lower. Party A's 12,800 "long" contracts of December 2012 MEWA Light Crude Oil PFD Index would then be delivered for co-settlement along with Party A's 800 "short" underlying December 2012 EFP contracts as of Nov. 16, 2012.

Another feature of these teachings is that each Exchange will advise counterparties via "pop-up screen" what the attendant algorithm-derived bid or offer price would be, based on last published executed trades for each of the "pair" contracts involved under the circumstances. The Exchanges would then give counterparties the ability to place an order based either on the Exchange-published information supplied or some other price independently selected by the counterparty.

Tradable Financial Instruments Involving Assets such as Industrial Minerals and Rocks, and Particularly Pot Ash and Fertilizers The systems and methods of the present disclosure are also equally well suited to handling the trading and exchange of various forms of Industrial Minerals and Rocks ("IMRs"), with little or no modification. One such IMR is potash. Various portions of the potash-related information noted below was derived from Independent Chemical Information Service ("ICIS"), part of the Reed Business Information group. For additional details, one may refer to www.icis.com/fertilizers/potash/price-reporting-methodology.

Potash aka potassium (chemical element symbol: K) is the seventh most common naturally-occurring element in nature, one of three main macronutrients required for plants. Crucial for all living cells to function, potassium aids in energy metabolism and, as an essential ingredient in various fertilizers, is a key agent in the plant growth process, creating the following benefits such as, but not limited to: 1) activating enzyme functions; 2) processing vitamins; 3) guarding against drought and disease; and 4) improving nutrient qualities of crops by inter alia strengthening their roots, thereby enhancing crop stability and yields. Whilst fertilizers consume over 90% of global potassium production, there are also industrial uses for potash (e.g., production of potassium hydroxide, water softeners, de-icing salts, other salt compounds, fireworks, soaps, glass and biodiesels).

Elemental potassium does not occur in nature because it reacts violently with water. As one compound or another, potassium makes up ~2.6% of the weight of the Earth's crust. Some common rock formations contain potassium, such as orthoclase and granite. Large evaporate deposits from ancient lake and sea beds exist from which rocks are mined and then potash is extracted. Those rock formations include: Sylvite (KCl or potassium chloride); Sylvinite (KCl+NaCl or sodium chloride/haite); Carnalite (KMgCl or potassium magnesium chloride); Polyhaite; Kainite; and Laingbeinite.

Presently, the world's largest potash deposits are found in Canada and Russia, followed by Belarus, Germany, the Dead Sea (in both Israel and Jordan) and the U.S. The relative value of potash grades imported and exported is often reported in terms of their potassium oxide (K2O) equivalent content, which signifies the amount of potassium in fertilizer as if it were all in the form of potassium oxide.

Potash can be mined traditionally or by using more costly solution evaporation processes. Most potash mines today are deep shaft mines located as much as 4,400 feet (1,400 m) underground. Others are strip mined, having been laid down in horizontal layers as sedimentary rock. In above-ground processing plants, KCl is separated from the mixture to produce a high-analysis natural potassium fertilizer. Other naturally occurring potassium salts can be separated by various procedures, resulting in potassium sulfate and potassium magnesium-sulfate.

The most common potash fertilizer—muriate of potash ("MOP")—comes in two formations: Standard MOP and Granular MOP. Standard MOP, used by relatively poorer countries for direct applications, is also used for chemical "NPK" production into various compound fertilizers that employ different nitrogen (N), phosphorous (P) and potassium (K) mixtures. Standard MOP is traded in larger volumes compared to granular MOP (noted below) because it's the potash of choice for two of the world's largest importers: India and China. For the most part, Standard MOP is traded according to the following terms:

FOB Vancouver;
FOB Dead Sea (Israel and Jordan);
FOB Baltic (Ventspils, Latvia);
CFR China (per contract prices);
CFR SE Asia (mainly Indonesia and Malaysia, as well as others); and
CFR India (note: India contracts tend to also be represented in the low range for FOB Baltic, Vancouver and Dead Sea prices).

Granular MOP, which tends to sell at a premium over standard MOP, is used in bulk blending for NPK production, as well as in direct applications in relatively wealthier countries using advanced soil fertilization methods. Granulation slows down absorption of fertilizer nutrients, prolonging their action. Granular MOP transactions typically take place according to the following terms:

FOB Vancouver—generally considered the "benchmark" of the group;
FOB Baltic (Ventspils, Latvia), albeit the bulk of granular MOP exported out of the Baltic goes to Brazil on CFR terms;
FOB Dead Sea (Israel and Jordan);
CFR Brazil; and
CIF within Northwest Europe.

The second most common potash fertilizer—sulfate of potash ("SOP")—is a specialty product most frequently offered in granular form. Most SOP production methods require MOP to be used as a feedstock; thus, granular SOP sells at a premium over granular MOP.

SOP can be created by several methods, such as leaching, but for the most part is produced using the more traditional Manheim process, which calls for MOP to be treated with sulfuric acid. As such, changes in the price of MOP and sulfuric acid feedstock influence SOP prices. Following are different grades of SOP listed in the order of their relative cost—lowest to highest:

Standard grade SOP, which is most often used for direct application;
Granular grade SOP, which is predominantly used in bulk blending; and
Water soluble grade, which is used in specialized irrigation fertilizers.

Other formulations of potash include potassium nitrate (KNO3), potassium hydroxide (KOH) and potassium magnesium chloride (KMgCl aka carnallite). However, their trade volumes are relatively insignificant compared to MOP.

Producers of Potash and Fertilizers, their Customers and Logistics

Global potash production is concentrated in terms of both number of countries and companies in which it is produced, partly as a result of the location of potash reserves. Canada is the largest potash producer in the world (32% of 2011 global output), followed by Russia (19%), Belarus (16%), the Dead Sea (Israel and Jordan and Germany. On a company level, supply is even more concentrated, with the top five potash producers controlling over two-thirds of global supply belonging to one of two cartels.

Exports from Canada are coordinated through Canpotex, an international marketing & logistics company jointly owned by the Saskatchewan potash producers Potash Corporation of Saskatchewan, Inc., The Mosaic Company, and Agrium, Inc. The Potash Corporation of Saskatchewan, Inc. ("PCS") is the world's second largest potash producer by output, with over 9 million metric tonnes shipped in 2011. Approximately one-half of this production went to North American customers. The Potash Corporation of Saskatchewan reportedly owns 54% of Canpotex. The Mosaic Company was launched in 2004 as a result of a merger between IMC Global (a fertilizer company whose origins date back to 1909) and Cargill's crop nutrition division. The Mosaic Company currently operates five mines, one in New Mexico and four in Canada, and is also the largest producer of finished phosphate products. The Mosaic Company reportedly owns 37% of Canpotex. Agrium, Inc. reportedly owns 9% of Canpotex.

As a competitive world supplier, Canpotex's logistics and delivery network employs bulk cargo vessels, storage facilities and thousands of specialized railcars catering to such foreign markets as Australia, Brazil, China, India, Indonesia, Japan, Korea and Malaysia. An extensive vessel chartering and brokerage network offers comprehensive ocean freight services to customers in those regions, enabling approximately 95% of all shipments to be transacted on Cost & Freight ("CFR") basis. This provides Canpotex with the flexibility to combine cargoes (e.g., potash and sulphur) wherever possible to minimize ocean freight costs.

The Belarusian Potash Company ("BPC"), a joint stock company venture established in 2005 by Uralkali (Russian) and Belaruskali (Belarusian), is based in Minsk and supported by regional offices in New Delhi, Beijing, Singapore, Sao Paolo, Panama and Chicago. BPC supplies potash fertilizers to customers in Europe, India, China, Central and South America, U.S., Asia and Pacific, and Africa. During 2008, BPC's shareholdings were altered when Belarusian Railways acquired 5% of the company, thereby reducing Belaruskali's stake from 50% to 45%; Uralkali's 50% holding was left unchanged.

After months of rumors and denials that BPC was falling apart, it became official in July 2013 when Uralkali, the world's largest potash producer announced it would switch exports away from BPC to Uralkali Trading (its Swiss subsidiary) and abandon output limits that previously underpinned prices. Cooperation with its Belarus neighbor/partner ended because Belaruskali was reportedly undermining sales accords following an earlier Belarus government action, which cancelled BPC's exclusive right to export the nation's potash and fertilizer. After BPC's break-up, potash prices extended their earlier descent and volatility has intensified, which strengthens support for a centralized Global IMR e-Bourse to facilitate the hedging of potash and fertilizer price volatility.

Major shipments of MOP from Vancouver and Baltic (Ventspils, Latvia) into Brazil, India and China are shipped on Panamax vessels (>50,000 tonnes). Russian MOP products to the U.S. are shipped on Panamax, as well as Babymax (35,000 to 40,000 tonnes) and Handysize (15,000 to 35,000 tonnes; usually 25,000 tonnes). Most potash sold into Central and Latin America are Handysize cargoes, except for Brazil which often takes Panamax cargoes due to the size of its domestic market and high requirement for potash.

On occasion, product out of Ventspils and Chile (the latter shipped to Brazil) may involve combination cargoes with urea, usually on Handysize vessels. Dead Sea and Canadian MOP is generally never sold in combination cargoes and usually involve Panamax and Babymax vessels. German potash producers also send combination cargoes into Latin America, which contain a variety of potash, SOP and other salt fertilizer products.

SOP shipment volumes tend to be much smaller and generally involve bulk sales that are part (roughly 5,000 tonnes) of a bulk carrier, usually a Handysize. Water soluble grade SOP is usually packed in 25 kg bags loaded onto pallets placed inside containers in order to prevent water from impacting/ruining the product.

Pricing and Trading

At the present time, no centralized ETD platform exists to contemporaneously match buyers and sellers' orders of potash and related fertilizers using standardized conventional spot, futures and options contracts. As is customary in most major markets lacking centralized exchanges, "agency-assessed prices" are used to settle derivatives contracts and referenced in many physical market contracts.

ICIS, The Market quotes potash prices on a weekly basis worldwide on Thursdays and provides Market Updates on Mondays, Tuesdays, Wednesdays and occasionally Fridays covering the following:

Granular MOP, FOB Vancouver (stated in U.S. $ per metric tonne);

Granular MOP, CFR Brazil (stated in U.S. $ per metric tonne);

Granular MOP, FOB Israel/Jordan (stated in U.S. $ per metric tonne);

Granular MOP, CFR Southeast Asia (stated in U.S. $ per metric tonne);

Granular MOP, CFR China (stated in U.S. $ per metric tonne); and

Bulk SOP, FOB Northwest Europe (stated in euros per tonne).

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code," as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

In some implementations, the systems and methods disclosed herein can be implemented on any computing devices such networked together, where the computing devices include servers, desktop computers, and handheld computing devices such as tablets and smartphones. In these implementations, the modules described herein can be implemented on these devices using a combination of software and hardware that provide the desired functionalities. Due to connectivity and interactions between the modules and the computing devices, integrating the modules with the computing devices creates specialized computing devices that are specifically suitable for the systems and methods disclosed herein.

While specific examples have been described in the specification and illustrated in the drawings, it will be understood by those skilled in the art that various changes may be made and equivalence may be substituted for elements thereof without departing from the scope of the present teachings as defined in the claims. Furthermore, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings.

What is claimed is:

1. A computerized Sharia-based exchange-traded derivatives system to match, execute and settle buy and sell orders for tradable assets placed over an Exchange controlled network by authenticated counterparties desiring to manage price volatility risks by trading the tradable assets with quality and logistics properties falling within parameters unique to benchmark-specific tradable asset sets formulated by the Exchange for execution by the Exchange's Islamic Exchange Subsidiary ("IES") as part of Islamic-financed commodity transactions employing at least one of Murabaha, Musawama or Salam-style transactions, that match the bilateral interests of Exchange-For-Physical ("EFP") buyers with EFP sellers having practically, rather than absolute, opposite trading and hedging interests predicated on physical delivery or receipt of underlying assets as of the attendant settlement date, the system comprising:

at least one processor configured to run a plurality of non-transitory, machine executable instructions;

a dongle having a dongle processor and an electronic interface to enable electronic communications between a personal electronic device of the user and the system;

at least one memory in communication with the processor, the memory configured to store the non-transitory, machine executable instructions which when running on the processor are configured to:

collect data for a plurality of tradable assets, wherein the data include geographic locations where the tradable assets are discovered or obtained from, and at least one parameter relating to either a rate of extraction of the tradable assets or a physical property or quality of the tradable assets;

select tradable assets from the plurality of tradable assets based on either the at least one parameter, or physical property or quality, of the tradable assets, to generate sets of tradable assets comprising tradable asset commodity benchmarks;

generate weights for generating weighted averages, wherein a weight for generating a weighted average for a tradable asset in a set is based on at least a rate of extraction of the tradable asset relative to an aggregate rate of extraction of the tradable assets in the set of tradable assets;

generate the tradable asset commodity benchmarks indicating aggregate qualities of the sets of tradable assets, wherein a tradable asset commodity benchmark for a set of tradable assets is generated based on weighted averages of the properties of the tradable assets in the set of tradable assets;

using a server in communication with a wide area network to electronically and wirelessly communicate the tradable asset commodity benchmarks to traders and receive orders for derivatives contracts from the traders to buy or sell derivatives contracts based on the tradable asset commodity benchmarks;

operate with the data collection, selection, weight generating, benchmark generating, communication and order processing modules as a Sharia conversion module ("SCM") employed to convert the Exchange's conventional ETD into Sharia-based ETD fit for execution by the IES in tandem with attendant Salam-style and/or Islamic-financed tradable asset commodity transactions;

use the dongle to implement an electronic high frequency trade and an order stuffing and blocking module to block attempts at high frequency trading practices such as spoofing and front-running orders; and wherein the order for derivatives contracts based on differences between actual properties of the tradable assets to be physically delivered under terms of an operative derivatives contract and aggregate qualities indicated by the tradable asset commodity benchmark is processed by an algorithm stored in the memory and running on the processor, the algorithm employed to compute a requisite number of long or short complementary index-based derivatives contracts taking into consideration attendant tradable asset quality variability including at least one physical quality of the tradable assets, with said contracts being executable for co-delivery on the settlement date of the operative derivatives contract.

2. The system of claim 1, wherein the tradable assets comprise at least one of:
industrial minerals and rocks (IMRs); and
a commodity that is produced globally and has varying quality and logistics properties that impact the asset's value in the market place.

3. The system of claim 1, wherein the tradable asset benchmarks comprise fuel commodity benchmarks, the tradable assets comprise fuels, the sets of tradable assets comprise sets of fuels, and the physical quality of the tradable assets comprises at least one of specific API gravity and sulfur content.

4. The system of claim 3 wherein:
the collected data is updated data periodically;
the fuel commodity benchmarks are based on the updated data; and
the updated fuel commodity benchmarks are communicated to the traders.

5. The system of claim 3 wherein:
the fuels include crude oils; and
the properties include specific API gravity and/or sulfur content of the fuels.

6. The system of claim 3, wherein the orders for the derivatives contracts encompass at least a plurality of futures, options, forwards, swaps and spreads traded between the traders and fuel producers via the Exchange, and either with or without using intermediaries in a chain of communications over the Exchange-controlled network, wherein the traders include fuel users and market speculators.

7. The system of claim 3, wherein the orders for derivatives contracts include derivatives contracts related to costs of transporting and warehousing the fuels stored in onboard tankers.

8. The system of claim 3, wherein the fuels include at least one of:
crude oils;
refined products derived from crude oil;
natural gas; and
coal.

9. The system of claim 3, wherein an order for derivatives contracts based on differences between actual properties of the fuel to be physically delivered under the terms of an operative derivatives contract and the aggregate qualities indicated by an operative fuel commodity benchmark is processed by an algorithm employed to compute the requisite number of long or short complementary index-based contracts valuing attendant fuel quality variability including but not limited to API gravity and sulfur content, with said contracts being executable for co-delivery on the operative derivatives contract's settlement date.

10. The system of claim 9, wherein the processor uses the algorithm to compute the requisite number of co-deliverable long or short complementary index-based contracts, in accordance with operations employing program logic summarized below:

first, the algorithm identifies the extent of a traders open long position, which is the commitment to take physical delivery of Exchange-qualified fuel, or the trader's short position, which is the commitment to physically deliver Exchange-qualified fuel, in the operative derivatives contract, each said operative derivatives contract being denominated in a standard unit of volume;

next, in cases involving crude oil, the algorithm multiplies the trader's identified open long or short derivatives contract position by a factor, related to the standard unit of volume, which is a predetermined number of times the difference between API gravity level specified in the operative fuel commodity benchmark and the actual level contained in the fuel to be physically received or delivered; upon solving that equation the algorithm determines the extent to which the trader must buy or sell complementary API Gravity Value Index contracts based on the factors described as follows:

long traders with differentials where the benchmark level is greater (i.e., more valuable) than the actual level contained in the fuel to be received must sell API Gravity Value Index contracts; conversely, long traders with differentials where the benchmark level is less than the actual level contained in the fuel to be received must buy API Gravity Value Index contracts; and short traders with differentials where the benchmark level is greater (i.e., more valuable) than the actual level contained in the fuel to be delivered must buy API Gravity Differential Index contracts; conversely, short traders with differentials where the benchmark level is less than the actual level contained in the fuel to be delivered must sell API Gravity Value Index contracts; and wherein the algorithm multiplies the trader's identified open long or short derivatives contract by a factor, related to the standard unit of volume, which is a predetermined number of time the difference between the sulfur content level specified in the operative fuel commodity benchmark and the actual level contained in fuel to be physically received or delivered; once that equation is solved, the algorithm determines the extent to which the trader must buy or sell complementary Sulfur Content Value Index contracts based on the factors described as follows:

long traders with differentials where the benchmark level is greater, that is less valuable, than the actual level contained in the fuel to be received, must buy Sulfur Content Value Index contracts; conversely, long traders with differentials where the benchmark level is less than the actual level contained in the fuel to be received must sell Sulfur Content Value Index contracts; and short traders with differentials where the benchmark level is greater, that is less valuable, than the actual level contained in the fuel to be delivered, must sell Sulfur Content Value Index contracts; conversely, short traders with differentials where the benchmark level is less than the actual level contained in the fuel to be delivered must buy Sulfur Content Value Index contracts.

11. The system of claim 10, wherein the Exchanges assist their counterparties via a pop-up screens that provide information concerning what the algorithm-derived bid or offer price would be based on the last published executed trades for each of their desired pair contracts, and then gives each counterparty the ability to place an order based on that Exchange-supplied price information or another price independently selected by the counterparty.

12. The system of claim 3, wherein the system is configured to process orders for Forward Point Delivery Index derivatives contracts based on differences between the actual, desired date for fuel to be delivered under the terms of an operative derivatives contract and the date indicated by an operative fuel commodity benchmark, wherein the orders are processed by a processor using an algorithm employed to compute the requisite number of long or short complementary index-based contracts valuing the fuel's forward point delivery variability, with said contracts being structured for co-delivery as of the operative derivatives contract's settlement date.

13. The system of claim 12, wherein the processor uses the algorithm to compute the requisite number of co-deliverable long or short complementary Forward Point Delivery Index derivatives contracts, in accordance with operations employing program logic summarized below:

first, the processor, using the algorithm, identifies the extent of a trader's open long position, which is a commitment to take physical delivery of exchange-qualified fuel, or short position, which is a commitment to physically deliver exchange-qualified fuel, in the operative derivatives, and wherein the operative derivatives contract is also known as the underlying EFP contract, and wherein each said operative derivatives contract is denominated in the standard unit of volume;

next, the processor, using the algorithm, multiplies the trader's identified open long or short underlying EFP contract position by the number of trading days forward differing between the delivery date specified in the operative fuel commodity benchmark and the actual, desired date specified by the trader for the fuel to be physically received or delivered under the underlying EFP contract; upon solving that said equation, the algorithm determines the extent to which traders must buy or sell complementary Forward Point Differential Index contracts based on the factors described as follows:

long traders experiencing a contango condition in their underlying EFP contract's market, that is where forward prices exceed spot prices, must buy complementary Forward Point Differential Index contracts; conversely, long traders experiencing a backwardation condition in their underlying EFP contract's market, that is where spot prices exceed forward prices, must sell complementary Forward Point Differential Index contracts; and short traders experiencing a contango condition in their underlying EFP contract's market must sell complementary Forward Point Differential Index contracts; conversely, short traders experiencing a backwardation condition in their underlying EFP's market must buy complementary Forward Point Differential Index contracts.

14. The system of claim 3, wherein:
the fuels include landlocked crude oils;
the properties include specific API gravity, sulfur content and the respective geographic locations of the landlocked crude oil's production, delivery and customer destination points; and the orders include derivatives contracts related to the costs of transporting and warehousing the landlocked crude oils using intermodal permutations, including at least one of storage terminal, pipeline, boat, rail and truck solutions.

15. The system of claim 1, wherein the wide area network comprises the Internet.

16. The system of claim 1, wherein the orders include Sharia-based exchange-traded derivatives ("ETD") for execution by an Islamic Exchange Subsidiary ("IES") of the Exchange as part of Islamic-financed commodity transactions employing at least one of Murabaha, Musawama or Salam-style transactions, that match the bilateral interests of Exchange-For-Physical ("EFP") buyers with EFP sellers having other than absolutely opposite hedging interests.

17. The system of claim 1, wherein the IES, the candidates to become IES registrants, the Sharia-based ETD specifications and their attendant Islamic-financed and/or Salam-style commodity transaction specifications are sanctioned by Islamic scholars ("RIS").

18. The system of claim 17, wherein upon official notification of RIS-sanctioned status, each IES registrant that is a member of the ECN's communities of interest ("COI") specified for a Salam-style and/or Islamic-financed tradable asset commodity transaction is provided a customized dongle assigned with an IES authorization code serving to:
- restrict and control on a need to know/act basis each IES registrant's ability to access, validate, store and share data passed along the ECN to its COI, contemporaneously, without intermediaries in the chain of communications, thereby ensuring inter alia that only Sharia-compliant trades are executed and settled;
- grant the IES registrant access to all reported data concerning bids, offers and executed trades posted by the Exchange and the IES, respectively; and
- curtail investor and speculator interests, when required to maintain RIS-sanctioned status, by imposing Sharia-based ETD position limits and instilling blockades against high-frequency trading practices such as spoofing and front-running orders.

19. The system of claim 1, wherein a back-to-back execution module is operative with the SCM to consolidate both exchanges' customer bids and offers for ultimate execution at the IES pursuant to a cross-liquidity algorithm factoring the prevailing relative order flow of each exchange and triggers, when necessary, back-to-back executions whereby:
- the Exchange becomes a counterparty to its primary customers' conventional ETD bid or offer;
- the Exchange then simultaneously posts an offsetting offer or bid, which upon SCM processing is converted to a Sharia-based offer or bid with the IES; and
- the IES executes a Sharia-based ETD trade involving its primary customers, offset by the aforementioned Exchange bid or offer.

20. A method for forming a Sharia compliant Exchange, wherein the Exchange has an Islamic Exchange Subsidiary ("IES") for handling Islamic-financed commodity transactions, the method comprising:
- using a processor controlled dongle to electronically interface to a user's personal electronic device, and to control access by a user to the exchange, to enforce trading position limits associated with the user, and to prevent non-Sharia compliant trading practices by the user;
- using a processor running non-transitory machine executable instructions, and in communication with a memory, to:
  - collect data for a plurality of tradable assets, wherein the data include geographic locations where the tradable assets are discovered or obtained, a rate of extraction of the tradable assets, and physical properties of the tradable assets;
  - select specific tradable assets from the plurality of tradable assets based on the properties of the tradable assets to generate sets of tradable assets comprising tradable asset commodity benchmarks;
  - generate and store in the memory weights for generating weighted averages, wherein a weight for generating a weighted average for a tradable asset in a set is based on a rate of extraction of the tradable asset relative to an aggregate rate of extraction of the tradable assets in the set of tradable assets;
  - generate and store in the memory the tradable asset commodity benchmarks indicating aggregate qualities of the sets of tradable assets, wherein a benchmark for a set of tradable assets is generated based on weighted averages of the properties of the tradable assets in the set of tradable assets;
  - communicate the benchmarks to traders and receiving orders for derivatives contracts for the tradable assets from the traders based on the benchmarks;
  - process an order for derivatives contracts based on differences between actual properties of the tradable assets to be delivered under the terms of an operative derivatives contract and the aggregate qualities indicated by an operative tradable asset commodity benchmark, and which determines the number of long or short complementary index-based derivatives that a specific trader may be required to obtain for co-delivery on the operative derivatives contract's settlement date; and
- wherein the data collection, the selection, the weight generating, the benchmark generating, the communication and the order processing operations are carried out using a Sharia conversion module ("SCM") employed to convert the Sharia compliant Exchange's conventional exchange traded derivative (ETD) into a Sharia-based ETD fit for execution by the IES in tandem with attendant Salam-style and/or Islamic-financed tradable asset commodity transactions.

21. The method of claim 20, wherein the tradable assets comprise at least one of:
- industrial minerals and rocks; and
- a commodity that is produced and shipped globally and has varying quality and logistics properties that impact the asset's value in the market place.

22. The method of claim 20, wherein the tradable assets include fuels.

23. The method of claim 22, further comprising:
- updating the data periodically;
- generating updated fuel commodity benchmarks based on the updated data; and
- communicating the updated fuel commodity benchmarks to the traders;
- wherein the fuels include crude oils; and
- wherein the properties include at least one of specific API gravity and sulfur content of the fuels.

24. The method of claim 20, wherein the orders for derivatives contracts encompass futures, options, forwards, swaps and spreads, the method further comprising trading the orders between the traders and tradable asset producers via an exchange and either with or without using intermediaries, wherein the traders include tradable asset users and market speculators.

25. The method of claim 20, wherein the orders include derivatives contracts related to costs of transporting and warehousing the tradable assets when stored onboard tankers.

26. The method of claim 20, wherein the tradable assets include fuels including at least one of:
   crude oils;
   refined products derived from crude oil;
   natural gas;
   coal;
   landlocked crude oils; and
   wherein the properties include specific API gravity, sulfur content and the respective geographic locations of the landlocked crude oil's production, delivery and customer destination points.

27. The method of claim 26, wherein the orders include derivatives contracts related to the costs of transporting and warehousing the landlocked crude oils using intermodal permutations including at least one of storage terminal, pipeline, boat, rail and truck solutions.

28. A computerized Sharia-based exchange-traded derivatives system to match, execute and settle buy and sell orders for tradable assets placed over an Exchange controlled network by authenticated counterparties desiring to manage price volatility risks by trading the tradable assets with quality and logistics properties falling within parameters unique to benchmark-specific tradable asset sets formulated by the Exchange for execution by the Exchange's Islamic Exchange Subsidiary ("IES") as part of Islamic-financed commodity transactions employing at least one of Murabaha, Musawama or Salam-style transactions, that match the bilateral interests of Exchange-For-Physical ("EFP") buyers with EFP sellers having practically, rather than absolute, opposite trading and hedging interests predicated on physical receipt or delivery of underlying assets as of the attendant settlement date, the system comprising:
   at least one processor configured to run a plurality of non-transitory, machine executable instructions;
   a dongle having an electronic interface configured to be placed in communication with those electronic devices belonging to IES registrants that are members of the ECN's specified COI, and to control trades being implemented by those electronic devices to ensure that only Sharia compliant trades are executed, reported and settled over the ECN;
   at least one memory in communication with the processor, the memory configured to store the non-transitory, machine executable instructions which when running on the processor are configured to:
      collect data for a plurality of tradable assets, wherein the data include geographic locations where the tradable assets are discovered or obtained from, and at least one parameter relating to either a rate of extraction of the tradable assets or a physical property or quality of the tradable assets;
      select tradable assets from the plurality of tradable assets based on either the at least one parameter, or physical property or quality, of the tradable assets, to generate sets of tradable assets comprising tradable asset commodity benchmarks;
      generate weights for generating weighted averages, wherein a weight for generating a weighted average for a tradable asset in a set is based on at least a rate of extraction of the tradable asset relative to an aggregate rate of extraction of the tradable assets in the set of tradable assets;
      generate the tradable asset commodity benchmarks indicating aggregate qualities of the sets of tradable assets, wherein a tradable asset commodity benchmark for a set of tradable assets is generated based on weighted averages of the properties of the tradable assets in the set of tradable assets;
      communicate the tradable asset commodity benchmarks to traders and receive orders for derivatives contracts from the traders to buy or sell derivatives contracts based on the tradable asset commodity benchmarks;
      operate with the data collection, selection, weight generating, benchmark generating, communication and order processing modules as a Sharia conversion module ("SCM") employed to convert the Exchange's conventional ETD into Sharia-based ETD fit for execution by the IES in tandem with attendant Salam-style and/or Islamic-financed tradable asset commodity transactions; and
   wherein the order for derivatives contracts based on differences between actual properties of the tradable assets to be physically delivered or received under terms of an operative derivatives contract and aggregate qualities indicated by the tradable asset commodity benchmark is processed by an algorithm stored in the memory and running on the processor, the algorithm employed to compute a requisite number of long or short complementary index-based derivatives contracts taking into consideration attendant tradable asset quality variability including at least one physical quality of the tradable assets, with said contracts being executable for co-delivery on the settlement date of the operative derivatives contract.

* * * * *